(12) United States Patent
Steffey et al.

(10) Patent No.: US 10,663,588 B2
(45) Date of Patent: *May 26, 2020

(54) COMBINATION SCANNER AND TRACKER DEVICE HAVING A FOCUSING MECHANISM

(71) Applicant: FARO Technologies, Inc., Lake Mary, FL (US)

(72) Inventors: Kenneth Steffey, Longwood, FL (US); Robert E. Bridges, Kenneth Square, PA (US); David H. Parker, Earlysville, VA (US)

(73) Assignee: FARO TECHNOLOGIES, INC, Lake Mary, FL (US)

( * ) Notice: Subject to any disclaimer, the term of this patent is extended or adjusted under 35 U.S.C. 154(b) by 312 days.

This patent is subject to a terminal disclaimer.

(21) Appl. No.: 15/675,988

(22) Filed: Aug. 14, 2017

(65) Prior Publication Data

US 2017/0343673 A1    Nov. 30, 2017

Related U.S. Application Data

(63) Continuation of application No. 14/697,807, filed on Apr. 28, 2015, now Pat. No. 9,746,560, which is a
(Continued)

(51) Int. Cl.
*G01S 17/42* (2006.01)
*G01C 15/00* (2006.01)
(Continued)

(52) U.S. Cl.
CPC ............ *G01S 17/42* (2013.01); *G01B 11/002* (2013.01); *G01C 15/002* (2013.01);
(Continued)

(58) Field of Classification Search
CPC ...... G01C 15/006; G01C 15/002; G02B 3/14; G02B 26/004; G02B 26/0875
See application file for complete search history.

(56) References Cited

U.S. PATENT DOCUMENTS 4,834,531 A    5/1989    Ward
8,294,769 B2   10/2012   Otani et al.
(Continued)

FOREIGN PATENT DOCUMENTS

EP    2259010 A1    12/2010
GB    2472514 A      9/2011
(Continued)

OTHER PUBLICATIONS

International Search Report and Written Opinion for International Application No. PCT/US2013/078239 dated Jun. 2, 2014; 9 pgs.
(Continued)

*Primary Examiner* — Luke D Ratcliffe
(74) *Attorney, Agent, or Firm* — Cantor Colburn LLP

(57) ABSTRACT

A three-dimensional (3D) coordinate measurement device combines tracker and scanner functionality. The tracker function is configured to send light to a retroreflector and determine distance to the retroreflector based on the reflected light. The tracker is also configured to track the retroreflector as it moves, and to determine 3D coordinates of the retroreflector. The scanner is configured to send a beam of light to a point on an object surface and to determine 3D coordinate of the point. In addition, the scanner is configured to adjustably focus the beam of light.

14 Claims, 24 Drawing Sheets

Related U.S. Application Data continuation-in-part of application No. 13/765,014, filed on Feb. 12, 2013, now Pat. No. 9,036,134.

(51) Int. Cl.

| | | |
|---|---|---|
| *G01S 17/66* | (2006.01) | |
| *G01S 17/89* | (2020.01) | |
| *G01S 7/48* | (2006.01) | |
| *G01S 7/481* | (2006.01) | |
| *G01B 11/00* | (2006.01) | |
| *G01S 17/87* | (2020.01) | |
| *G01S 17/86* | (2020.01) | |

(52) U.S. Cl.
CPC .......... *G01S 7/4808* (2013.01); *G01S 7/4813* (2013.01); *G01S 7/4817* (2013.01); *G01S 7/4818* (2013.01); *G01S 17/66* (2013.01); *G01S 17/86* (2020.01); *G01S 17/87* (2013.01); *G01S 17/89* (2013.01)

(56) References Cited

U.S. PATENT DOCUMENTS

| | | | |
|---|---|---|---|
| 8,331,624 B2* | 12/2012 | Braunecker | G01C 1/04 382/106 |
| 8,654,355 B2 | 2/2014 | Steffensen et al. | |
| 9,036,134 B2 | 5/2015 | Steffey et al. | |
| 9,746,560 B2 | 8/2017 | Steffey et al. | |
| 2011/0007305 A1 | 1/2011 | Bridges et al. | |
| 2011/0032509 A1* | 2/2011 | Bridges | G01S 7/4818 356/5.13 |
| 2011/0260033 A1 | 10/2011 | Steffensen et al. | |
| 2012/0236320 A1 | 9/2012 | Steffey et al. | |
| 2012/0262550 A1* | 10/2012 | Bridges | G01C 15/002 348/46 |
| 2013/0155386 A1 | 6/2013 | Bridges | |
| 2014/0226145 A1 | 8/2014 | Steffey et al. | |
| 2014/0307252 A1 | 10/2014 | Hinderling et al. | |
| 2015/0241204 A1 | 8/2015 | Steffey | |
| 2015/0355327 A1* | 12/2015 | Goodwin | G01S 17/325 356/5.01 |
| 2016/0170024 A1 | 6/2016 | Bockem et al. | |
| 2017/0269213 A1 | 9/2017 | Luthi et al. | |
| 2017/0343673 A1 | 11/2017 | Steffey et al. | |
| 2019/0250271 A1 | 8/2019 | Steffey | |

FOREIGN PATENT DOCUMENTS

| | | |
|---|---|---|
| WO | 2010057169 A2 | 5/2010 |
| WO | 20130115836 A1 | 8/2013 |

OTHER PUBLICATIONS

Chinese Office Action for Application No. 201380072855.9 dated Aug. 30, 2016; 5 pgs.

Great Britain Search Report for Application No. GB1606876.9 dated Sep. 9, 2016; 5 pgs.

\* cited by examiner

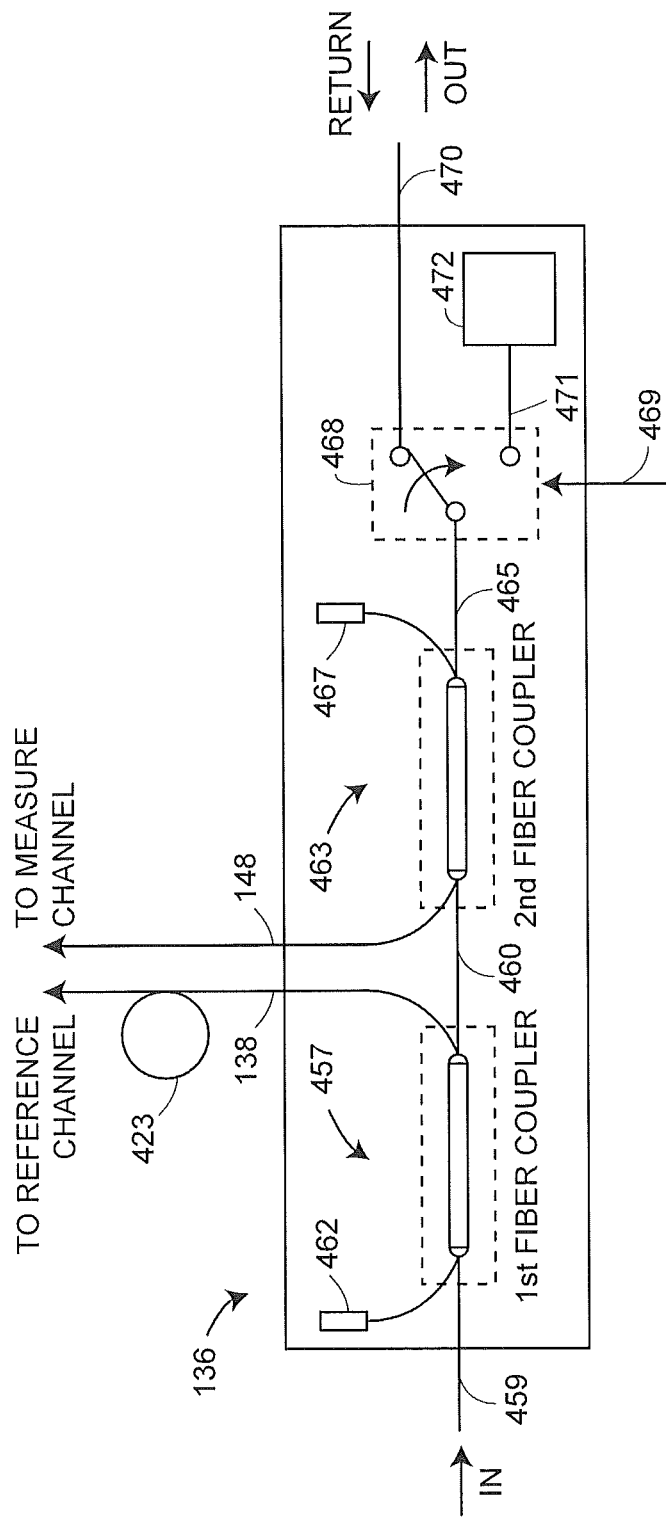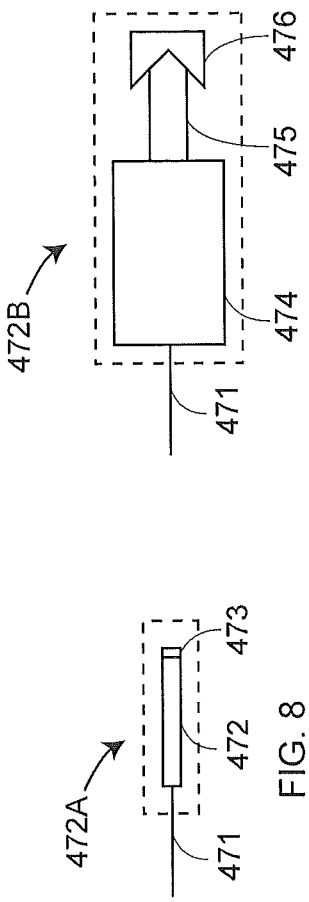

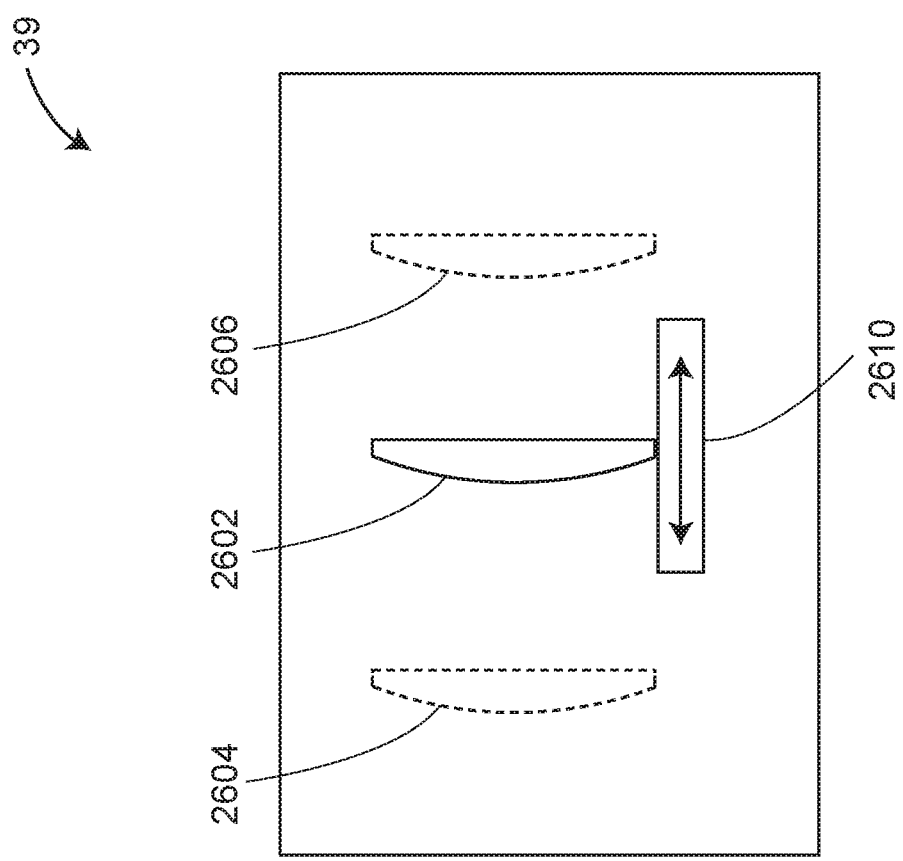

COMBINATION SCANNER AND TRACKER DEVICE HAVING A FOCUSING MECHANISM

CROSS-REFERENCE TO RELATED APPLICATIONS

The present application is a continuation application of U.S. patent application Ser. No. 14/697,807 filed Apr. 28, 2015, which is a continuation-in-part application of U.S. patent application Ser. No. 13/765,014 entitled filed on Feb. 12, 2013, the contents of which are incorporated by reference herein in their entirety.

BACKGROUND

The subject matter disclosed herein relates to an optical measurement device that measures dimensional coordinates, and in particular to a noncontact optical measurement device have multiple optical devices for measuring an object.

Noncontact optical measurement devices may be used to determine the coordinates of points on an object. One type of optical measurement device measures the three-dimensional (3D) coordinates of a point by sending a laser beam to the point. The laser beam may impinge directly on the point or on a retroreflector target in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest.

The laser tracker is a particular type of coordinate-measuring device that tracks the retroreflector target with one or more laser beams it emits. Optical measurement devices closely related to the laser tracker are the laser scanner and the total station. The laser scanner steps one or more laser beams to points on a surface. It picks up light scattered from the surface and from this light determines the distance and two angles to each point. The total station, which is most often used in surveying applications, may be used to measure the coordinates of diffusely scattering (noncooperative) targets or retroreflective (cooperative) targets.

The laser tracker operates by sending a laser beam to a retroreflector target that is used to measure the coordinates of specific points. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Since the placement of the cube corner within the sphere has a known mechanical relationship to the measured point (i.e. the perpendicular distance from the vertex to any surface on which the SMR rests remains constant, even as the SMR is rotated) the location of the measured point may be determined. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an absolute distance meter (ADM). If an object blocks the path of the laser beam from one of these trackers, the IFM loses its distance reference. The operator must then track the retroreflector to a known location to reset to a reference distance before continuing the measurement. A way around this limitation is to include an ADM in the tracker. The ADM can measure distance in a point-and-shoot manner.

Since trackers dwell on a point, it is desirable to place a constraint on laser power to maintain a desired categorization within the IEC 60825-1 standard. Thus it is desired that the tracker work at low laser power. In addition to clearly defining the measurement point, the SMR returns a large fraction of the laser power. In contrast, a laser scanner may be arranged to move continuously, this allows a desirable IEC 60825-1 categorization since total energy deposited on a portion of a person located in the area of operation is small. Thus, laser scanners can operate at higher laser power levels and operate with non-cooperating targets, albeit typically at lower accuracy and shorter distances than a laser tracker.

The laser scanner also sends out a laser beam toward an object. Since laser trackers interact with the operator (via the retroreflector target), it is desirable for the laser to be visible. However, laser scanners may be operated at other wavelengths—for example, infrared or visible wavelengths since the operator does not need to visually see the light beam. The laser scanner receives light reflected back from the object and determines the distance to the point on the object based in part on the time of flight for the light to strike the object and return to the scanner. Some laser scanners sequentially rotate about a zenith axis and simultaneously rotating the laser beam about the azimuth axis, the coordinates for points in the area about the laser scanner may be determined. Other laser scanners direct a beam of light to a single point or in a predetermined pattern, such as a raster patter for example.

It should be appreciated that the laser scanner may obtain the coordinates for a plurality of points much faster than a laser tracker. However, the laser tracker will measure the distance with a higher accuracy. Further, since laser trackers dwell on specific points, measurements typically integrate for fractions of a second to reduce the noise in the electronics and atmospheric turbulence. Since laser scanners typically measure on the order of a million points per second, measurements are typically made in the order of microseconds or fractions of a microsecond. Thus in scanners the noise resulting from electronics and atmospheric turbulence may be much greater.

Accordingly, while existing noncontact optical measurement devices are suitable for their intended purposes the need for improvement remains, particularly providing an optical measurement device that allows an operator to select between multiple modes of operation.

BRIEF DESCRIPTION

According to one aspect of the invention, a coordinate measurement device is provided. The coordinate measurement device includes a structure rotatable about a first axis and a second axis, the second axis being substantially perpendicular to the first axis. An optical delivery system is operably coupled to the structure. A first absolute distance meter is operable to determine a first distance from the coordinate measurement device to a retroreflector target based at least in part on a first light emitted through the optical delivery system. A second absolute distance meter is provided having an adjustable focusing mechanism, the second absolute distance meter being operable to determine a second distance from the coordinate measurement device to the object surface based at least in part on a second light emitted through the optical delivery system. A position detector is operable to receive a portion of the first light reflected by the retroreflector target, the position detector operable to generate a signal based at least in part on a location at which the portion of first light strikes the position detector. A processor is provided having a non-transitory computer readable media configured to operate in a first mode and a second mode. Wherein the first mode includes tracking the retroreflector target based at least in part on the signal, and determining a first three-dimensional coordinate of the retroreflector target based at least in part on a first angle of rotation of the structure about the first axis to the retroreflector target at, the second angle of rotation of the structure about the second axis to the retroreflector target, and the first distance of the retroreflector target. Wherein the second mode includes directing the second light to the object surface and determining a second three-dimensional coordinate of a point on the object surface based at least in part on the first angle of rotation of the structure about the first axis to the point on the object surface, the second angle of rotation of the structure about the second axis to the point on the object surface, and the second distance of the point on the object surface, the second mode further including adjusting the adjustable focusing mechanism.

According to another aspect of the invention, method of determining three-dimensional coordinates with a coordinate measurement device is provided. The method comprises: providing a structure rotatable about a first axis and a second axis, the second axis being perpendicular to the first axis; emitting a first light from a first absolute distance meter towards a retroreflector via an optical delivery system, the first absolute distance meter and optical delivery system being operably coupled to the structure; determining a first distance from the coordinate measurement device to the retroreflector with the first absolute distance meter based at least in part on the first light; emitting a second light with a second absolute distance meter towards an object surface via the optical delivery system, the second absolute distance meter being operably coupled to the structure; determining a second distance from the coordinate measurement device to a point on the object surface based on the optical delivery system; receiving a portion of the first light reflected by the retroreflector target with a position detector and generating a signal with the position detector based at least in part on a location at which the portion of the first light strikes the position detector; tracking, in a first mode of operation, the retroreflector target based at least in part on the signal, and determining a first three-dimensional coordinate of the retroreflector target based at least in part on a first angle of rotation of the structure about the first axis to the retroreflector target at, the second angle of rotation of the structure about the second axis to the retroreflector target, and the first distance of the retroreflector target; and directing, in a second mode of operation, the second light to the object surface and determining a second three-dimensional coordinate of a point on the object surface based at least in part on the first angle of rotation of the structure about the first axis to the point on the object surface, the second angle of rotation of the structure about the second axis to the point on the object surface, and the second distance of the point on the object surface, the second mode further including adjusting the adjustable focusing mechanism.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 5-10 are block diagrams of electrical and electro-optical elements within an absolute distance meter (ADM) for a laser tracker portion and a scanner distance meter of the optical measurement device of FIG. 1;

FIG. 26 is a schematic representation of an adjustable focusing mechanism according to an embodiment.

The detailed description explains embodiments of the invention, together with advantages and features, by way of example with reference to the drawings.

DETAILED DESCRIPTION

Embodiments of the present invention provide for an optical measurement device that may operate as either a laser tracker or a laser scanner. This provides advantages in allowing either a higher accuracy measurement using a cooperative target, usually handheld by an operator, or a faster (usually) lower accuracy measurement, usually without the active assistance of an operator. These two modes of operation are provided in a single integrated device.

Figure 1:
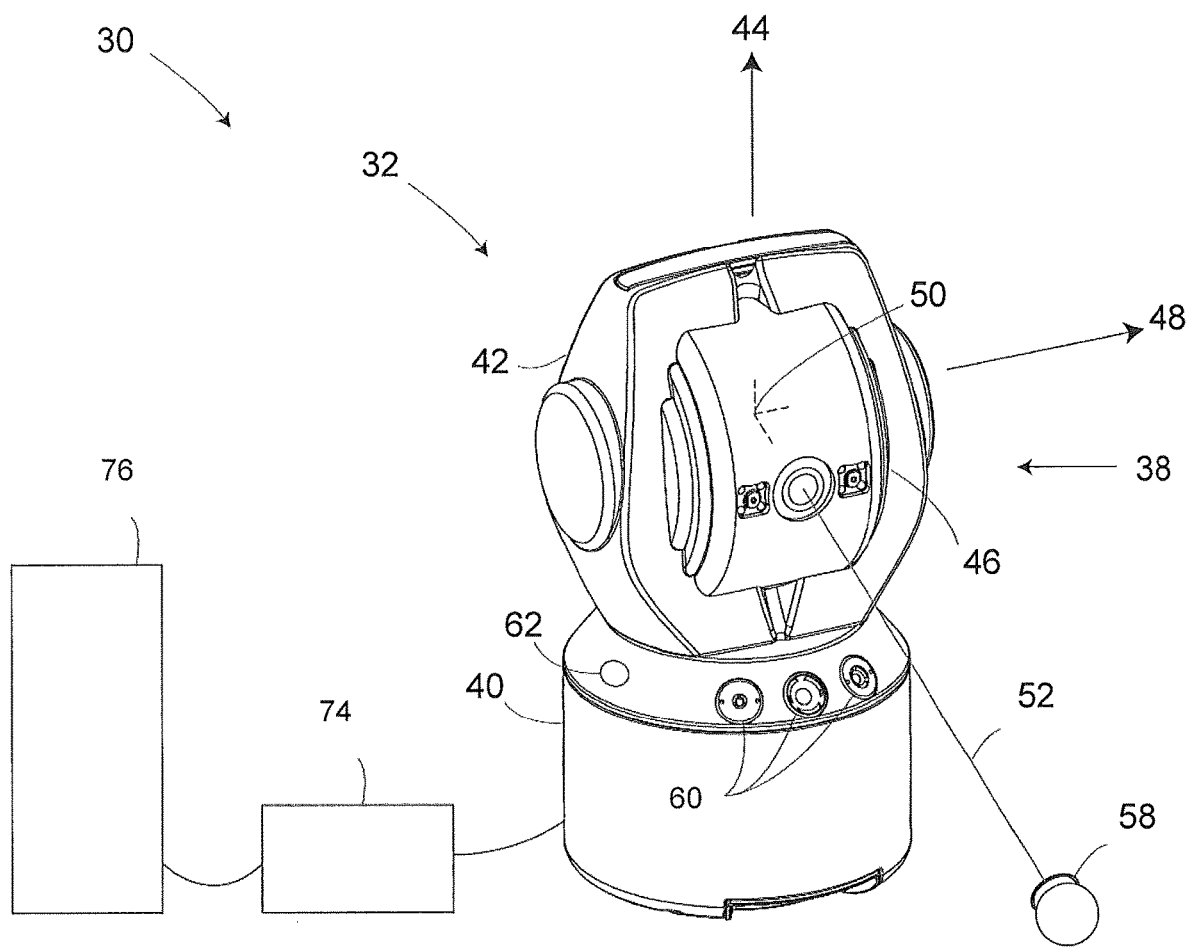
FIG. 1 is a perspective illustration of an optical measurement device in accordance with an embodiment of the invention.
Figure 2:
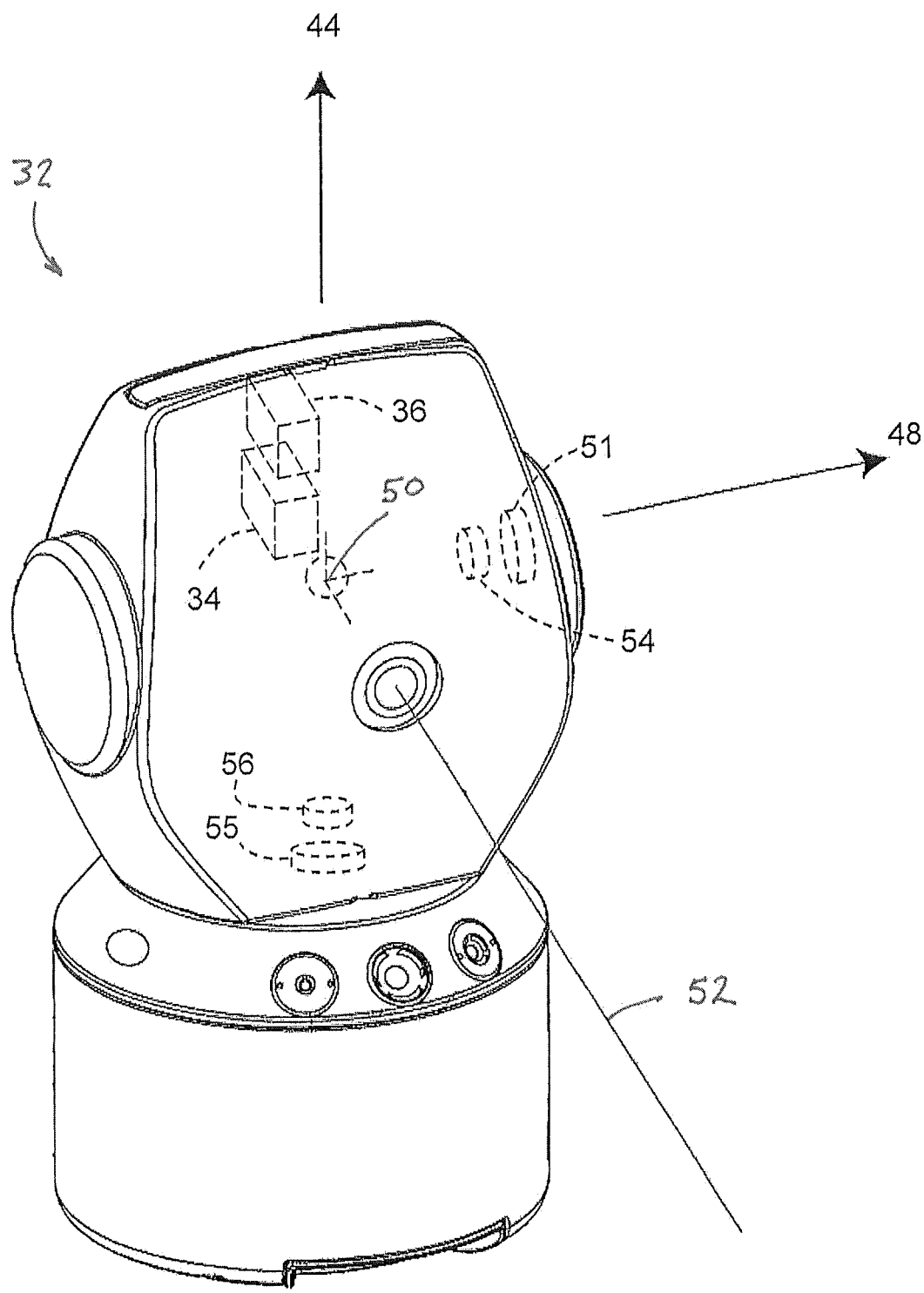
FIG. 2 is a partial perspective illustration of the optical measurement device of FIG. 1 illustrating the location of a tracker and scanner portions, including sensors within the device.

Referring now to FIGS. 1-2, an optical measurement device 30 is shown that provides for multiple modes of operation. The device 30 has a housing 32 containing tracker portion 34 to support laser tracking functionality and a scanner portion 36 to support scanner functionality. An exemplary gimbaled beam steering mechanism 38 includes a zenith carriage 42 mounted on an azimuth base 40 and rotated about an azimuth axis 44. A payload structure 46 is mounted on the zenith carriage 42, which rotates about a zenith axis 48. The zenith axis 48 and the azimuth axis 44 intersect orthogonally, internally to device 30, at the gimbal point 50. The gimbal point 50 is typically the origin for distance and angle measurements. One or more beams of light 52 virtually pass through the gimbal point 50. The emerging beams of light are pointed in a direction orthogonal to zenith axis 48. In other words, the beam of light 52 lies in a plane that is approximately perpendicular to the zenith axis 48 and that contains the azimuth axis 44. The outgoing light beam 52 is pointed in the desired direction by rotation of payload structure 46 about a zenith axis 48 by rotation of zenith carriage 40 about the azimuth axis 44.

A zenith motor 51 and zenith angular encoder 54 are arranged internal to the housing 32 and is attached to the zenith mechanical axis aligned to the zenith axis 48. An azimuth motor 55 and angular encoder 56 are also arranged internal to the device 30 and is attached to an azimuth mechanical axis aligned to the azimuth axis 44. The zenith and azimuth motors 51, 55 operate to rotate the payload structure 46 about the axis 44, 48 simultaneously. As will be discussed in more detail below, in scanner mode the motors 51, 55 are each operated in a single direction which results in the scanner light following a continuous pathway that does not reverse direction. The zenith and azimuth angular encoders measure the zenith and azimuth angles of rotation to relatively high accuracy.

The light beam 52 travels to target 58 which reflects the light beam 53 back toward the device 30. The target 58 may be a noncooperative target, such as the surface of an object 59 for example. Alternatively, the target 58 may be a retroreflector, such as a spherically mounted retroreflector (SMR) for example. By measuring the radial distance between gimbal point 50 and target 58, the rotation angle about the zenith axis 48, and the rotation angle about the azimuth axis 44, the position of the target 58 may be found within a spherical coordinate system of the device 30. As will be discussed in more detail herein, the device 30 includes one or more mirrors, lenses or apertures that define an optical delivery system that directs and receives light.

The light beam 52 may include one or more wavelengths of light, such as visible and infrared wavelengths for example. It should be appreciated that, although embodiments herein are discussed in reference to the gimbal steering mechanism 38, other types of steering mechanisms may be used. In other embodiments a mirror may be rotated about the azimuth and zenith axes for example. In other embodiments, galvo mirrors may be used to steer the direction of the light. Similar to the exemplary embodiment, these other embodiments (e.g. galvo mirrors) may be used to steer the light in a single direction along a pathway without reversing direction as is discussed in more detail below.

In one embodiment, magnetic nests 60 may be arranged on the azimuth base 40. The magnetic nests 60 are used with the tracker portion 34 for resetting the tracker to a "home position" for different sized SMRs, such as 1.5, ⅞ and 0.5 inch SMRs. And on-device retroreflector 62 may be used to reset the tracker to a reference distance. Further, a mirror (not shown) may be used in combination with the retroreflector 62 to enable performance of self-compensation, as described in U.S. Pat. No. 7,327,446, the contents of which are incorporated by reference.

Figure 3:
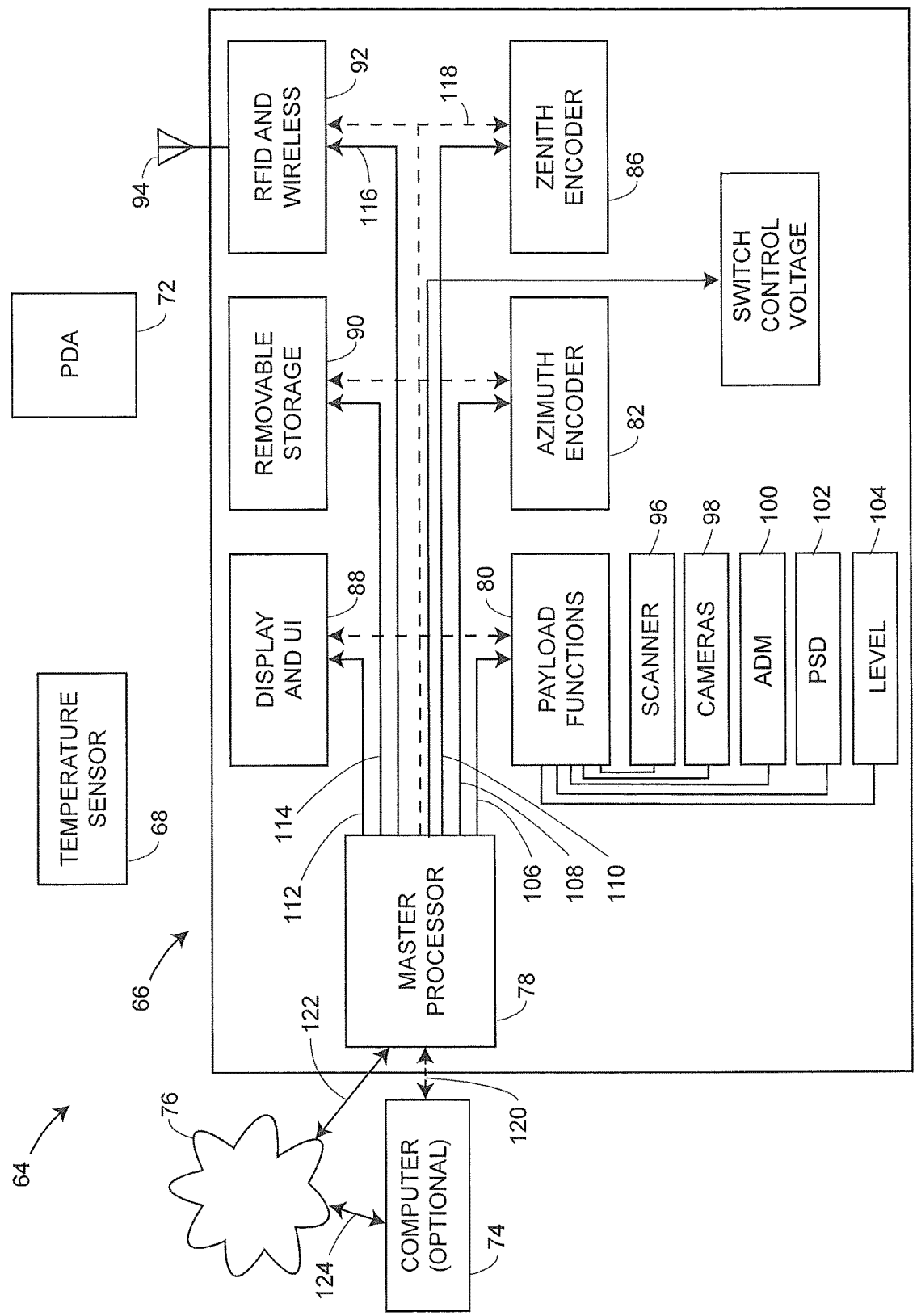
FIG. 3 is a block diagram of the electrical and computing system for the device of FIG. 1.

Referring now to FIG. 3, an exemplary controller 64 is illustrated for controlling the operation of the device 30. The controller 64 includes a distributed processing system 66, processing systems for peripheral elements 68, 72, computer 74 and other network components 76, represented here is a cloud. Exemplary embodiments of distributed processing system 66 includes a master processor 78, payload function electronics 80, azimuth encoder electronics 82, zenith encoder electronics 86, display and user interface (UI) 88, removable storage hardware 90, radio frequency identification (RFID) electronics 92, and antenna 94. The payload function electronics 80 includes a number of functions such as the scanner electronics 96, the camera electronics 98 (for camera 168, FIG. 11), the ADM electronics 100, the position detector (PSD) electronics 102, and the level electronics 104. Some or all of the sub functions in payload functions electronics 80 have at least one processing unit, which may be a digital signal processor (DSP) or a field programmable gate array (FPGA), for example.

Many types of peripheral devices are possible, such as a temperature sensor 68 and a personal digital assistant 72. The personal digital assistant 72 may be a cellular telecommunications device, such as a smart phone for example. The device 30 may communicate with peripheral devices in a variety of means, including wireless communication over antenna 94, by means of vision system such as a camera, and by means of distance and angular readings of the laser tracker to a cooperative target. Peripheral devices may contain processors. Generally, when the term scanner processor, laser tracker processor or measurement device processor is used, it is meant to include possible external computer and cloud support.

In an embodiment, a separate communications medium or bus goes from the processor 78 to each of the payload function electronics units 80, 82, 86, 88, 90, 92. Each communications medium may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock signal may correspond, for example, to a rising edge of a clock pulse. In one embodiment, information is transmitted over the data line in the form of a packet. In other embodiments, each package includes an address, a numeric value, a data message, and a checksum. The address indicates where, within the electronics unit, the data messages are to be directed. The location may, for example, correspond to a processor subroutine within the electronics unit. The numeric value indicates the length of the data message. The data message contains data or instructions for the electronics units to carry out. The checksum is a numeric value that is used to minimize the chance of errors in data transmitted over the communications line.

In an embodiment, the processor 78 transmits packets of information over the bus 106 to payload functions electronics 80, over bus 108 to azimuth encoder electronics 82, over bus 110 to zenith encoder electronics 86, over bus 112 to display and UI electronics 88, over bus 114 to removable storage hardware 90, and over bus 116 to RFID and wireless electronics 92.

In an embodiment, the processor 78 also sends a synchronization pulse over the synch bus 118 to each of the electronic units at the same time. The synch pulse provides a way of synchronizing values collected by the measurement functions of the device 30. For example, the azimuth encoder electronics 82 in the zenith electronics 86 latch their encoder values as soon as the synch pulse is received. Similarly, the payload function electronics 80 latch the data collected by the electronics contained within the payload structure. The ADM and position detector all latch data when the synch pulse is given. In most embodiments, the camera and inclinometer collect data at a slower rate than the synch pulse rate but may latch data at multiples of the synch period.

In one embodiment, the azimuth encoder electronics 82 and the zenith encoder electronics 86 are separated from one another and from the payload function electronics 80 by slip rings (not shown). Where slip rings are used, the bus lines 106, 108, 110 may be separate buses. The optical electronics processing system 66 may communicate with an external computer 74, or may provide communication, display, and UI functions within the device 30. The device 30 communicates with computer 74 over communications link 120, such as an Ethernet line or a wireless connection, for example. The device 30 may also communicate with other elements, represented by cloud 76, over communications link 122, which might include one or more electrical cables, such as Ethernet cables for example, or one or more wireless connections. The element 76 may be another three-dimensional test instrument for example, such as an articulated arm CMM, which may be relocated by device 30. A communication link 124 between the computer 74 and the element 76 may be wired or wireless. An operator sifting on a remote computer 74 may make a connection to the Internet, represented by cloud 76, over an Ethernet or wireless link, which in turn connects them to processor 78 over an Ethernet or wireless link. In this way, user may control the action of a remote device, such as a laser tracker.

Figure 4:
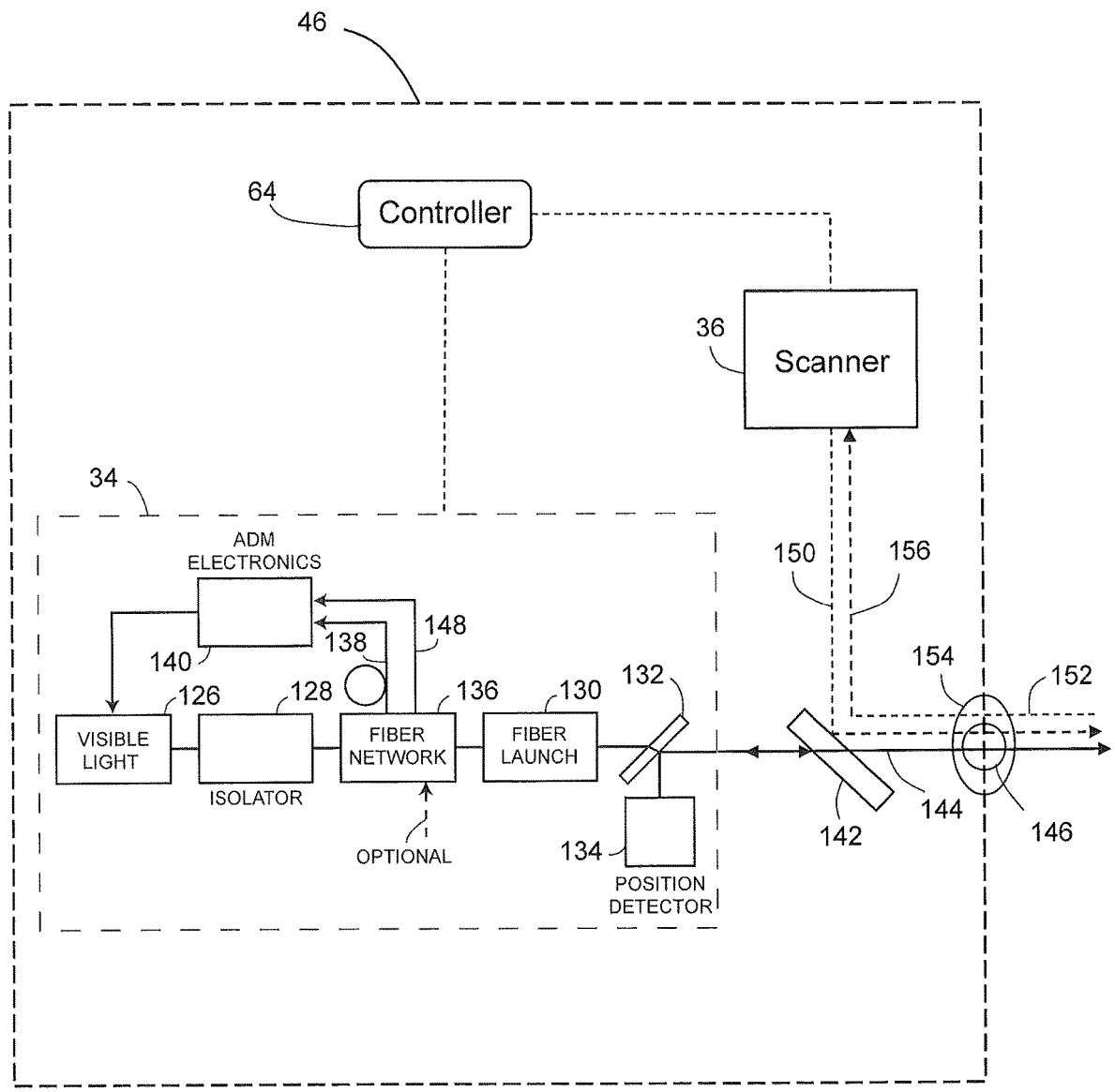
FIG. 4 is a schematic illustration of the device of the payload portion of FIG. 1 including a block diagram of the of the optical measurement device in accordance with an embodiment of the invention.

Referring now to FIG. 4, an embodiment of payload structure 46 within a device 30 is shown having a tracker portion 34 and a scanner portion 36. The portions 34 and 36 are integrated to emit light from the tracker and scanner portions over a substantially common optical inner beam path, which is represented in FIGS. 1 and 12-14 by the beam of light 52. However, although the light emitted by the tracker and scanner portions travel over a substantially common optical path, in an embodiment, the beams of light from the tracker and scanner portions are emitted at different times. In another embodiment, the beams are emitted at the same time.

The tracker portion 34 includes a light source 126, an isolator 128, a fiber network 136, ADM electronics 140, a fiber launch 130, a beam splitter 132, and a position detector 134. In an embodiment, the light source 126 is emits visible light. The light source may be, for example, a red or green diode laser or a vertical cavity surface emitting laser. The isolator may be a Faraday isolator, and attenuator, or any other suitable device capable of sufficiently reducing the amount of light transmitted back into the light source 126. Light from the isolator 128 travels into the fiber network 136. In one embodiment, the fiber network 136 is the fiber network shown in FIG. 6 as will be discussed in more detail below. The position detector 134 is arranged to receive a portion of the radiation emitted by the light source 126 and reflected by the target 58. The position detector 134 is configured to provide a signal to the controller 64. The signal is used by the controller 64 to activate the motors 51, 55 to steer the light beam 52 to track the target 58.

Some of light entering the fiber network 136 is transmitted over optical fiber 138 to the reference channel of the ADM electronics 140. Another portion of the light entering fiber network 136 passes through the fiber network 136 and the beam splitter 132. The light arrives at a dichroic beam splitter 142, which is configured to transmit light at the wavelength of the ADM light source. The light from the tracker portion 34 exits the payload structure 46 via an aperture 146 along optical path 144. The light from the tracker portion 34 travels along optical path 144, is reflected by the target 58, and returns along the optical path 144 to re-enter the payload structure 46 through the aperture 146. This returning light passes through dichroic beam splitter 142 and travels back into the tracker portion 34. A first portion of the returning light passes through the beam splitter 132 and into fiber launch 130 and into the fiber network 136. Part of the light passes into optical fiber 148 and passes into the measure channel of the ADM electronics 140. A second portion of the returning light is reflected off of the beam splitter 132 and into position detector 134.

Figure 5:
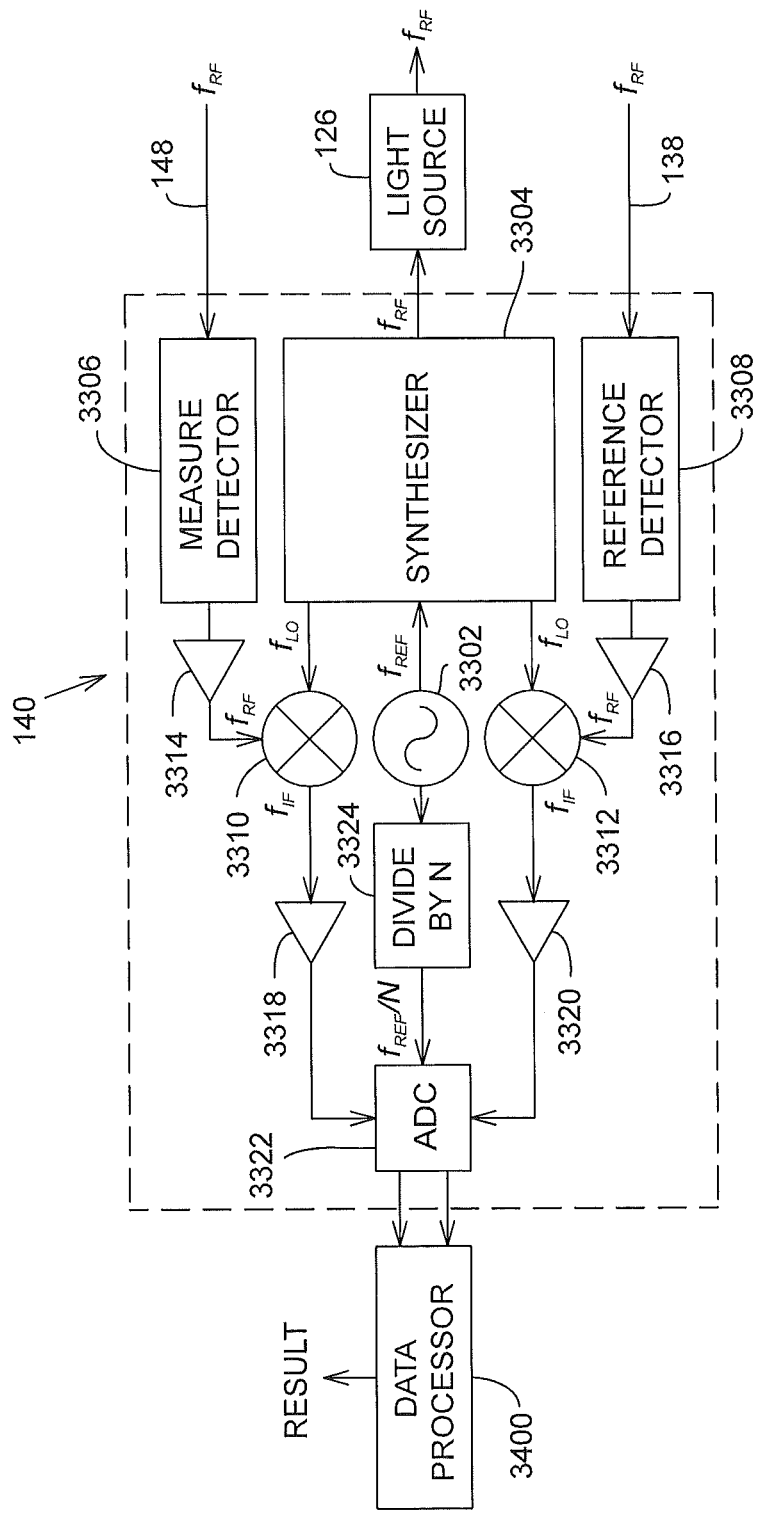

In one embodiment, the ADM electronics 140 is that shown in FIG. 5. The ADM electronics 140 includes a frequency reference 3302, a synthesizer 3304, a measure detector 3306, a reference detector 3308, a measure mixer 3310, a reference mixer 3312, conditioning electronics 3314, 3316, 3318, 3320, a divide-by-N prescaler 3324, and an analog-to-digital converter (ADC) 3322. The frequency reference, which may be an oven controlled crystal oscillator for example, sends a reference frequency $f_{REF}$, such as 10 MHz for example, to the synthesizer which generates two electrical signals—one signal at frequency $f_{RF}$ and two signals at frequency $f_{LO}$. The signal $f_{RF}$ goes to the light source 126. The two signals at frequency $f_{LO}$ go to the measure mixer 3310 and the reference mixer 3312. The light from optical fibers 138, 148 enter the reference and measure channels respectively. Reference detector 3308 and measure detector 3306 convert the optical signals into electrical signals. These signals are conditioned by electrical components 3316, 3314, respectively, and are sent to mixers 3312, 3310 respectively. The mixers produce a frequency $f_{IF}$ equal to the absolute value of $f_{LO}-f_{RF}$. The signal $f_{RF}$ may be a relatively high frequency, such as 2 GHz, while the signal $f_{IF}$ may have a relatively low frequency, such as 10 kHz.

The reference frequency $f_{REF}$ is sent to the prescaler 3324, which divides the frequency by an integer value. For example, a frequency of 10 MHz might be divided by 40 to obtain an output frequency of 250 kHz. In this example, the 10 kHz signals entering the ADC 3322 would be sampled at a rate of 250 kHz, thereby producing 25 samples per cycle. The signals from ADC 3322 are sent to a data processor 3400, such as one or more digital signal processors for example.

The method for extracting a distance is based on the calculation of phase of the ADC signals for the reference and measure channels. This method is described in detail in U.S.

Pat. No. 7,701,559 ('559 patent) to Bridges et al., the contents of which are herein incorporated by reference. The calculation includes the use of equations (1)-(8) of the '599 patent. In addition, when the ADM first begins to measure a target, the frequencies generated by the synthesizer are changed some number of times (for example, three times), and the possible ADM distances are calculated in each case. By comparing the possible ADM distances for each of the selected frequencies, an ambiguity in the ADM measurement is removed. The equations (1)-(8) of the '599 patent combined with synchronization methods and Kalman filter methods described in the '599 patent enable the ADM to measure a moving target. In other embodiments, other methods of obtaining absolute distance measurements may be used, such as pulsed time of flight methods for example.

Figure 6:
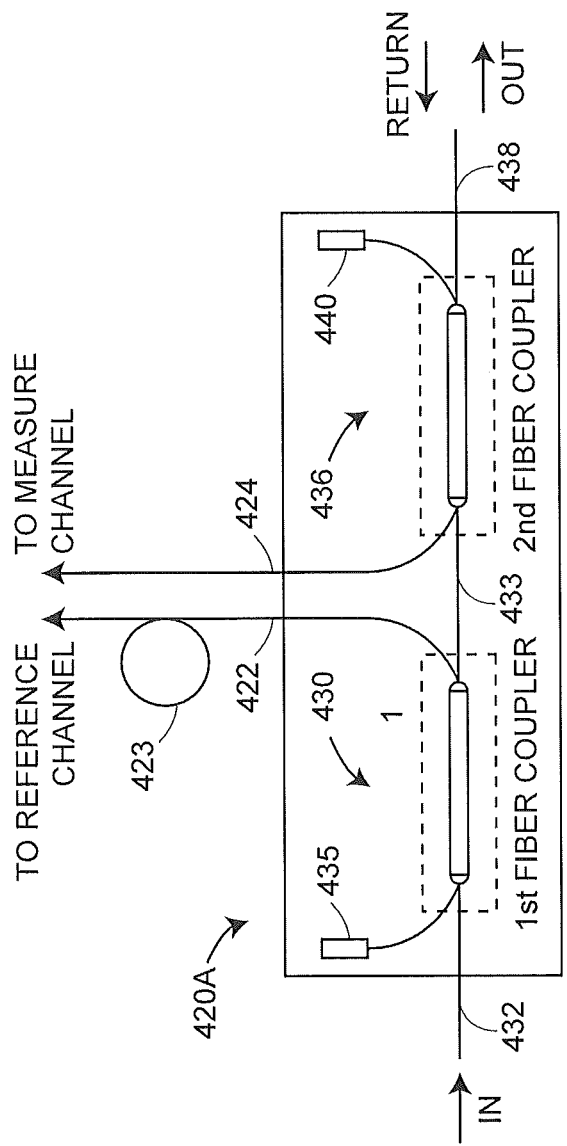

An embodiment of the fiber network 136 in FIG. 4 is shown as fiber network 420A in FIG. 6. This embodiment includes a first fiber coupler 430, a second fiber coupler 436 and low-transmission reflectors 435, 440. The first and second fiber couplers are 2×2 couplers each having two input ports and two output ports. Couplers of this type are usually made by placing two fiber cores in close proximity and then drawing the fibers. In this way, evanescent coupling between the fibers can split off a desired fraction of the light to the adjacent fiber. Light travels through the first fiber coupler 430 and splits between two paths, the first path through optical fiber 433 to the second fiber coupler 436 and in the second path through optical fiber 422 and fiber length equalizer 423. Fiber length equalizer 423 connects to fiber 138 in FIG. 4, which travels to the reference channel of the ADM electronics 140. The purpose of the fiber length equalizer 423 is to match the length of optical fibers traversed by the light in the reference channel to the length of optical fibers traversed by light in the measure channel. Matching the fiber lengths in this way reduces ADM errors caused by changes in the ambient temperature. Such errors may arise because the effective optical path length of an optical fiber is equal to the average index of refraction of the optical fiber times the length of the fiber. Since the index of refraction of the optical fibers depends on the temperature of the fiber, a change in the temperature of the optical fibers causes changes in the effective optical path lengths of the measure and reference channels. If the effective optical path length of the optical fiber in the measure channel changes relative to the effective optical path length of the optical fiber in the reference channel, the result will be an apparent shift in the position of the target 58, even if the target 58 is kept stationary. To avoid this problem, two steps are taken. First the length of the fiber in the reference channel is matched, as nearly as possible, to the length of the fiber in the measure channel. Second, the measure and reference fibers are routed side-by-side to the extent possible to ensure that the optical fibers in the two channels are subject to nearly the same changes in temperature.

The light travels through optical fiber 433 to the second fiber optic coupler 436 and splits into two paths, the first path to the low-reflection fiber terminator 440 and the second path to optical fiber 438, from which it exits the fiber network.

Another embodiment of the fiber network 136 is shown in FIG. 7. In this embodiment, the fiber network 136 includes a first fiber coupler 457, a second fiber coupler 463, two low-reflection terminations 462, 467, an optical switch 468, a retroreflector 472, and an electrical input 469 to the optical switch. The optical switch may be several types. A commercially available and relatively inexpensive type is the micro-electro-mechanical system (MEMS) type. This type may use small mirrors constructed for example as a part of a semiconductor structure. Alternatively, the switch could be a modulator, which is available for very fast switching at certain wavelengths and at a cost that is somewhat higher than a MEMS type switch. Switches may also be constructed of optical attenuators, which may respond to electrical signals and may be turned on and off by electrical signals sent to the attenuators. A description of the specifications that may be considered in selecting fiber-optic switches is given in U.S. Published Patent Application Publication No. 2011/0032509 to Bridges, the contents of which are incorporated by reference. In general, to obtain the desired performance and simplicity, the switch may be a fiber-optic switch. It should be appreciated that the optical switching concept described above should perform equally well in a fiber network based on two colors.

The fiber network 136 contains an optical switch 468 and a retroreflector 472. Ordinarily the light travels from fiber 465 through the upper port of optical switch 468 and out optical fiber 470. However, on occasion, when the laser tracker is not measuring a target, the optical switch diverts the optical signal from the optical fiber 465 to the optical fiber 471 and into the retroreflector 472. The purpose of switching the light to retroreflector 472 is to remove any thermal drift that may have occurred in the components of the ADM system. Such components might include, for example, opto-electronic components such as optical detectors, optical fibers of the ADM system, electrical components such as mixers, amplifiers, synthesizer, and analog-to-digital converters, and optical components such as lenses and lens mounts. For example, suppose that at a first time, the path length of the measure channel was found to be 20 mm longer than the reference channel with the optical switch 468 diverting the light to retroreflector 472. Suppose that at a later time the measure channel path length was found to be 20.003 mm longer than the reference channel path length with the optical switch 468 diverting the light to retroreflector 472. The ADM data processor would subtract 0.003 mm from subsequent ADM readings. It should be understood that this procedure would start anew whenever the tracker set the ADM value at a home position of the laser tracker.

In an embodiment, the retroreflector 472 is a fiber-optic retroreflector 472A of FIG. 8. This type of retroreflector 472 is typically a ferrule with the optical fiber polished at the end of the ferrule and covered with a coating 473, which might be gold or multiple layers of thin dielectric films, for example. In another embodiment, the retroreflector 472 is a free space retroreflector 472B of FIG. 9 that includes a collimator 474 and a retroreflector 476, which might be a cube-corner retroreflector slug, for example.

Figure 10:
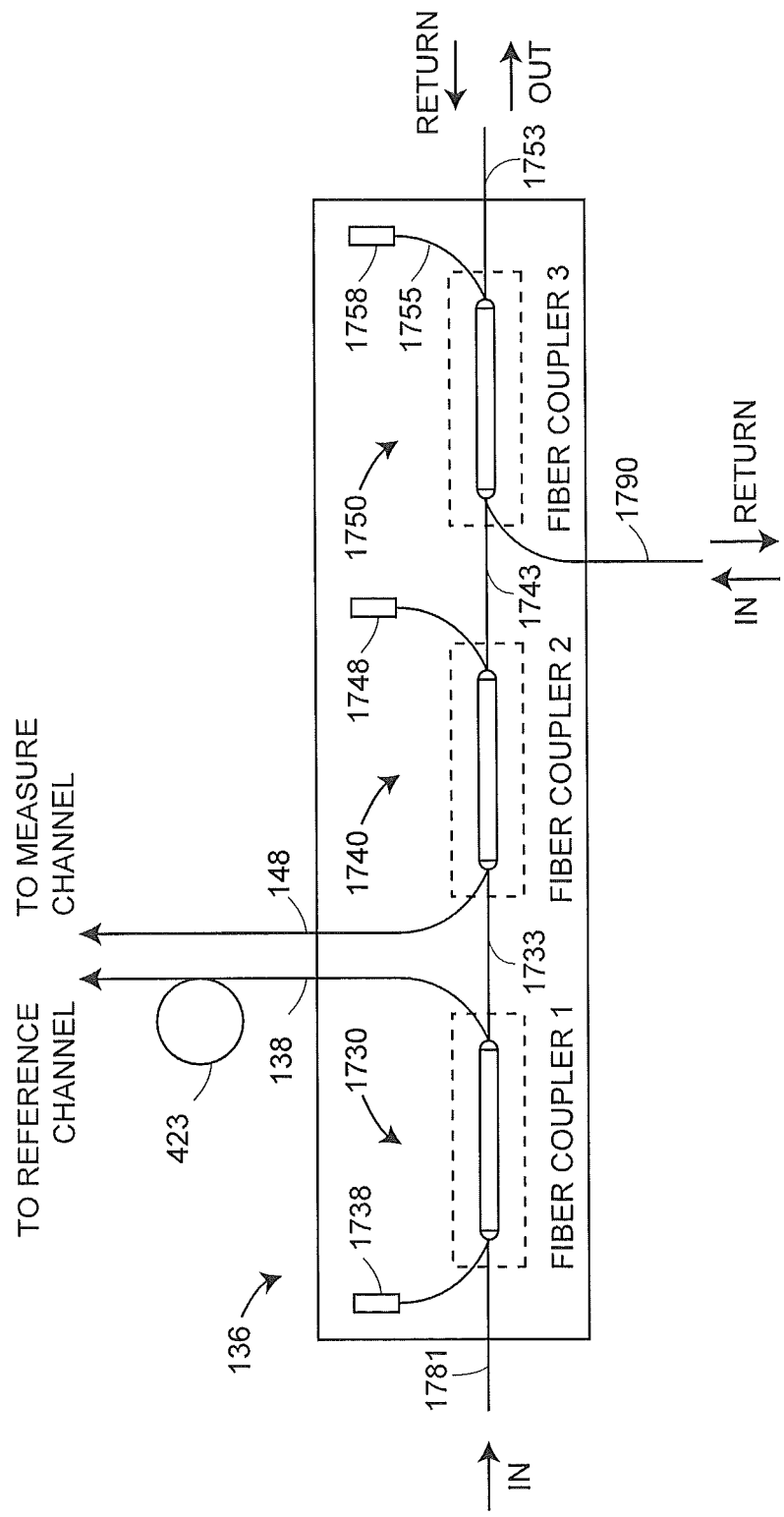

Still another embodiment of fiber network 136 is shown in FIG. 10. In this embodiment, the fiber network 136 includes a first fiber coupler 1730, a second fiber coupler 1740, a third fiber coupler 1750 and three low-reflection terminations 1738, 1748, 1758. The light from optical fiber 1781 enters fiber network 136 at the input port. The light travels through a first fiber coupler 1730. A portion of the light travels through optical fiber 138 and fiber length compensator for 423 before entering the reference channel of ADM electronics 140. Some of the light travels through a second fiber coupler 1740 and a third fiber coupler 1750 before passing out of the fiber network onto optical fiber 1753. The light from optical fiber 1743 enters into the third fiber coupler 1750, where it is combined with the light from a second light source (not shown) via optical fiber 1790 to form a composite light beam that travels on optical fiber 1753. The optical coupler 1750 is a dichroic coupler because it is designed to use two wavelengths. After the composite light beam carried in optical fiber 1753 travels out of the laser tracker and reflects off target 58, it returns to the fiber network 136. The light from the first light source passes through the third fiber coupler 1750, the second fiber coupler 1740, and enters optical fiber 148, which leads to the measure channel of the ADM electronics 140. The light from the second light source (not shown) returns to optical fiber 1790 and travels back toward the second light source (not shown).

The couplers 1730, 1740, and 1750 may be of the fused type. With this type of optical coupler, two fiber core/cladding regions are brought close together and fused. Consequently, light between the cores is exchanged by evanescent coupling. In the case of two different wavelengths, it is possible to design an evanescent coupling arrangement that allows complete transmission of a first wavelength along the original fiber and complete coupling of a second wavelength over to the same fiber. Ordinarily there is not a complete (100 percent) coupling of the light into the coupler 1750. However, fiber-optic couplers that provide good coupling for two or more different wavelengths are commercially available at common wavelengths such as 980 nm, 1300 nm, and 1550 nm. In addition, fiber-optic couplers may be commercially purchased for other wavelengths, including visible wavelengths, and may be designed and manufactured for other wavelengths. For example, in FIG. 10, it is possible to configure a fiber optic coupler 1750 so that the first light at its first wavelength travels from optical fiber 1743 to optical fiber 1753 with low optical loss. At the same time, the arrangement may be configured to provide for a nearly complete coupling of the second light on optical fiber 1790 over to the optical fiber 1753. Hence it is possible to transfer the first light and the second light through the fiber optic coupler and onto the same fiber 1753 with low loss. Optical couplers are commercially available that combine wavelengths that differ widely in wavelength. For example, couplers are commercially available that combine light at a wavelength of 1310 nm with light at a wavelength of 660 nm. For propagation over long distances with propagation of both wavelengths in a single transverse mode while having relatively low loss of optical power during propagation through the optical fiber, it is generally desirable that the two wavelengths be relatively close together. For example, the two selected wavelengths might be 633 nm and 780 nm, which are relatively close together in wavelength values and could be transmitted through a single-mode optical fiber over a long distance without a high loss. An advantage of the dichroic fiber coupler 1750 within the fiber network 136 is that it is more compact than a free space beam splitter. In addition, the dichroic fiber coupler ensures that the first light and the second light are very well aligned without requiring any special optical alignment procedures during production.

Referring back to FIG. 4, the scanner portion 36 may be embedded in a scanner such as that shown in FIG. 11 discussed herein below for example. The light, such as infrared light at about 1550 nm for example, from the scanner portion 36 travels along optical path 150 to the dichroic mirror 142. The dichroic mirror 142 is configured to reflect the light from the scanner while allowing light from the laser tracker to pass through. The light from scanner portion 36 travels to the target 58 and returns along optical path 152 to annular aperture 154. The returning light passes through the annular aperture 154 and along an outer beam path to reflect off of dichroic mirror 142 along optical path 156 back to the scanner portion 36. In one embodiment, the outer beam path (defined by the annular aperture 154) is coaxial with the inner beam path (defined by the aperture 146). Advantages may be gained by returning the scanner light through the annular aperture 154 to avoid of unwanted light from the aperture 146 that could corrupt the light reflected off of target 58.

In the exemplary embodiment the aperture 146 and the annular aperture 154 are concentrically arranged. In this embodiment, the aperture 146 has a diameter of about 15 mm and the annular aperture 154 has an inner diameter of 15 mm and an outer diameter of 35 mm.

It should be appreciated that in the exemplary embodiment the dichroic mirror 142 is positioned at the gimbal point 50. In this manner, light from both the scanner portion 36 and the tracker portion 34 may appear to originate from the same point in the device 30. In the exemplary embodiment, the tracker portion 34 emits a visible laser light, while the scanner portion 36 emits a light in the near infrared spectrum. The light from tracker portion 34 may have a wavelength about 700 nm and the light from the scanner portion 36 may have a wavelength of about 1550 nm.

Figure 11:
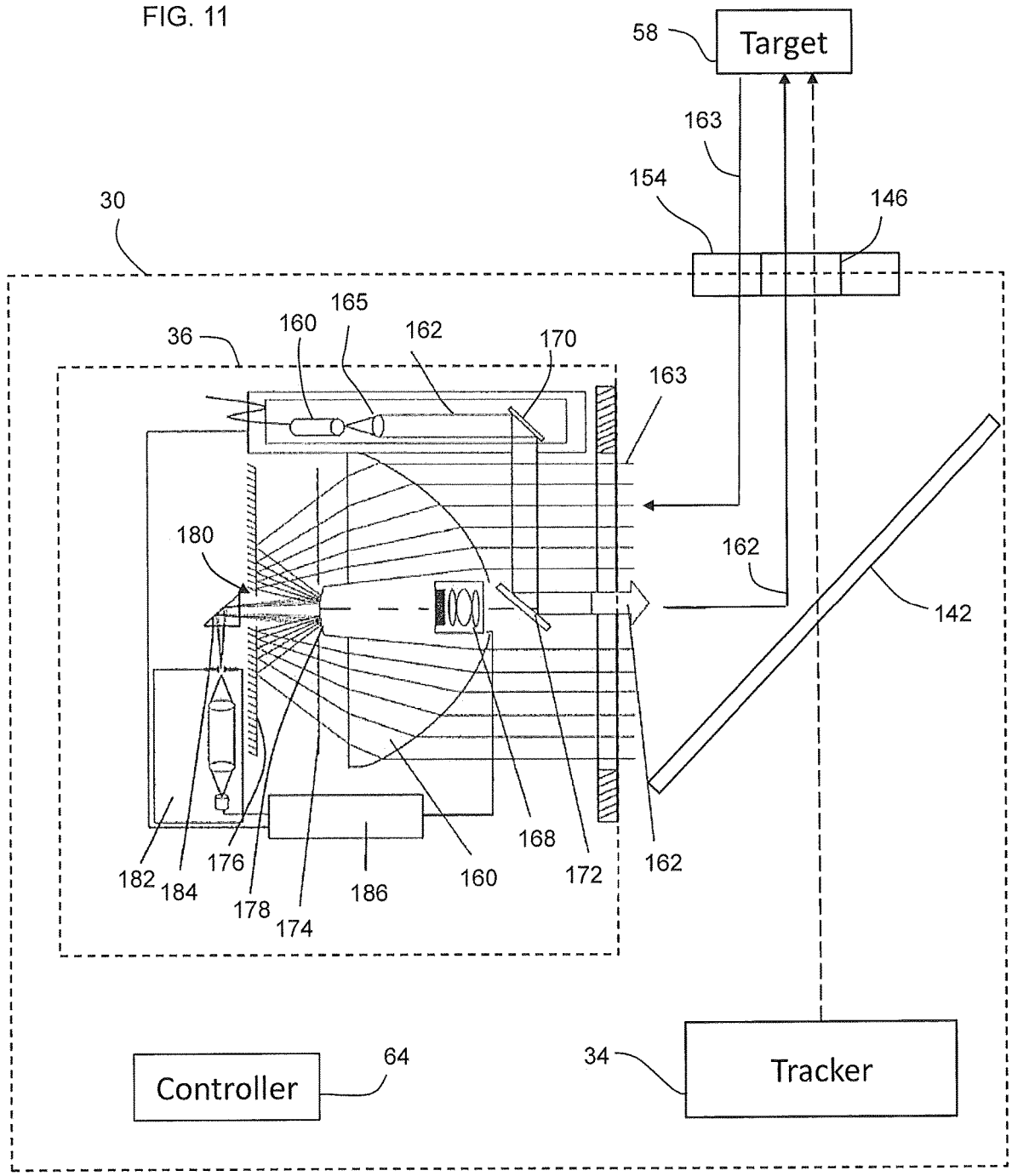
FIG. 11 is a schematic illustration of the device of FIG. 1 showing an optical axis along which light from the tracker and scanner is projected.

One embodiment of the scanner portion 36 is shown in FIG. 11. In this embodiment, the scanner portion 36 includes a light emitter 160 that emits a light beam 162 through a collimator 165. The light emitter 160 may be a laser diode that emits light at a wavelength in the range of approximately 1550 nm. It should be appreciated that other electromagnetic waves having, for example, a lesser or greater wavelength may be used. Light beam 162 may be intensity modulated or amplitude modulated, such as with a sinusoidal or rectangular waveform modulation signal. The light beam 162 is sent to the dichroic beam splitter 142, which reflects the light beam 162 through the aperture 146 and onto the target 58. In the exemplary embodiment, the light beam 162 is reflected off of a mirror 170 and a dichroic beam splitter 172 to allow the light beam 162 to travel along the desired optical path of light beams 52, 150. As will be discussed in more detail below, the use of a dichroic beam splitter 172 provides advantages in allowing for the incorporation of a color camera 168 that acquires images during operation. In other embodiments, the light emitter 160 may be arranged to directly transmit the light onto dichroic mirror 142 without first reflecting off a mirror 170 and a dichroic beam splitter 172.

As shown in FIGS. 4 and 11, the outgoing light from the tracker and scanner portions 34, 36 both pass through the same aperture 146. The light from these tracker and scanner portions 34, 36 are substantially collinear and travel along the optical path of light beam 52 of FIG. 1. On the return path, the light from the tracker portion 34 will have been reflected by a retroreflector target and hence is approximately collimated when it returns to the device 30. The returning beam of tracker light passes back through aperture 146, which is the same aperture through which it exited the device 30. On the other hand, the light from the scanner portion 36 usually strikes a diffusely scattering object 59 and spreads over a wide angle as it returns. A small portion of the reflected light passes through an annual aperture 154 positioned to have its inner diameter to be the same as (or concentric with) the outer diameter of the aperture 146. The returning light 163 reflects off the dichroic beam splitter, passes as beam of light 163 through the lens 160, reflects off reflective surfaces 180, 178, 176, and passes through a collection of lenses within the light receiver 182 before arriving at an optical detector. The returning scanner light is directed through the annular aperture 154 without including any light that may pass back through the inner aperture 146. This provides advantages since the optical power of the outgoing beam is so much greater than the light returned by the object that it is desirable to avoid having back reflections off optical elements along the path of the inner aperture 146.

In an embodiment, an optional color camera 168 is arranged so that a portion of the light reflected by the object passes through the dichroic mirror 172 into a color camera 168. The coatings on the dichroic mirror are selected to pass visible wavelengths picked up by a color camera while reflecting light at the wavelength emitted by the light emitter 160. The camera 168 may be coupled to the receiver lens 160 with an adhesive or within a recess for example. The color camera 168 allows color pictures to be acquired, usually by making a few discrete steps at a time following acquisition of data points by the distance meter within the scanner.

In an embodiment, a mask 174 is coaxially arranged on the optical axis behind the receiver lens 160. The mask 174 has a large area in which the returning light beam 163 is allowed to pass unimpeded. The mask 174 has shaded regions positioned radially outward from the optical axis in order to reduce intensity of the returning light beam 163 in such a way as to make the intensities of the returning light more nearly comparable for different object distances from the device 30.

In an embodiment, a rear mirror 176 is arranged on the optical axis behind the mask 174. The rear mirror 176 reflects the returning light beam 163 that is refracted by the receiver lens 166 towards a central mirror 178. The central mirror 178 is arranged in the center of the mask 174 on the optical axis. In embodiments having a color camera 168, this area may be shadowed by the color camera 168. The central mirror 178 may be an aspherical mirror which acts as both a negative lens (i.e. increases the focal length) and as a near-field-correction lens (i.e. shifts the focus of the returning light beam 163 which is reflected by the target). Additionally, a reflection is provided only to the extent that the returning light beam 163 passes the mask 174 arranged on the central mirror 178. The central mirror 178 reflects the returning light beam through a central orifice 180 in rear mirror 176.

A light receiver 182 having an entrance diaphragm, a collimator with filter, a collecting lens and an optical detector, is arranged adjacent rear mirror 176 opposite the mask 174. In one embodiment, a mirror 184 deflects the returning light beam 163 by 90°.

In one embodiment, the scanner portion 36 may have one or more processors 186, which may be the same as or supplementary to the scanner processor electronics 96 of FIG. 3. The processor 186 performs control and evaluation functions for the scanner portion 36. The processor 186 is coupled to communicate with the light emitter 160 and light receiver 182. The processor 186 determines for each measured point the distance between the device 30 and the target 58 based on the time of flight of the emitted light beam 162 and the returning light beam 163. In other embodiments, the processor 186 and its functionality may be integrated into the controller 64, which may correspond to the scanner processor 96, the master processor 78, the computer 74, or the networked elements 76 of FIG. 3.

The optical distance meters of the tracker portion 34 and scanner portion 36 may determine distance using the principle of time-of-flight. It should be understood that the term time-of-flight is used here to indicate any method in which modulated light is evaluated to determine distance to a target. For example, the light from the tracker portion 34 or scanner portion 36 may be modulated in optical power (intensity modulation) using a sinusoidal wave. The detected light may be evaluated to determine the phase shift between a reference and a measure beam to determine distance to a target. In another embodiment, the optical power of the light may be modulated by pulsed light having an approximately rectangular shape. In this case, the leading edge of the pulse may be measured on the way out of the device 30 and upon return to the device 30. In this case, the elapsed time is used to determine distance to the target. Another method involves changing the polarization state of light as a function of time by means of modulation of an external modulator and then noting the frequency of modulation at which returning light is extinguished after it is passed through a polarizer. Many other methods of measuring distance fall within the general time-of-flight category.

Another general method of measuring distance is referred to as a coherent or interferometric method. Unlike the previous method in which the optical power of a beam of light is evaluated, coherent or interferometric methods involve combining two beams of light that are mutually coherent so that optical interference of the electric fields occurs. Addition of electric fields rather than optical powers is analogous to adding electrical voltages rather than electrical powers. One type of coherent distance meters involves changing the wavelength of light as a function of time. For example, the wavelength may be changed in a sawtooth pattern (changing linearly with periodic repetitions). A device made using such a method is sometimes referred to as frequency modulated coherent laser (FMCL) radar. Any method, coherent or time-of-flight, may be used in the distance meters of the tracker portion 34 and scanner portion 36.

Figure 12:
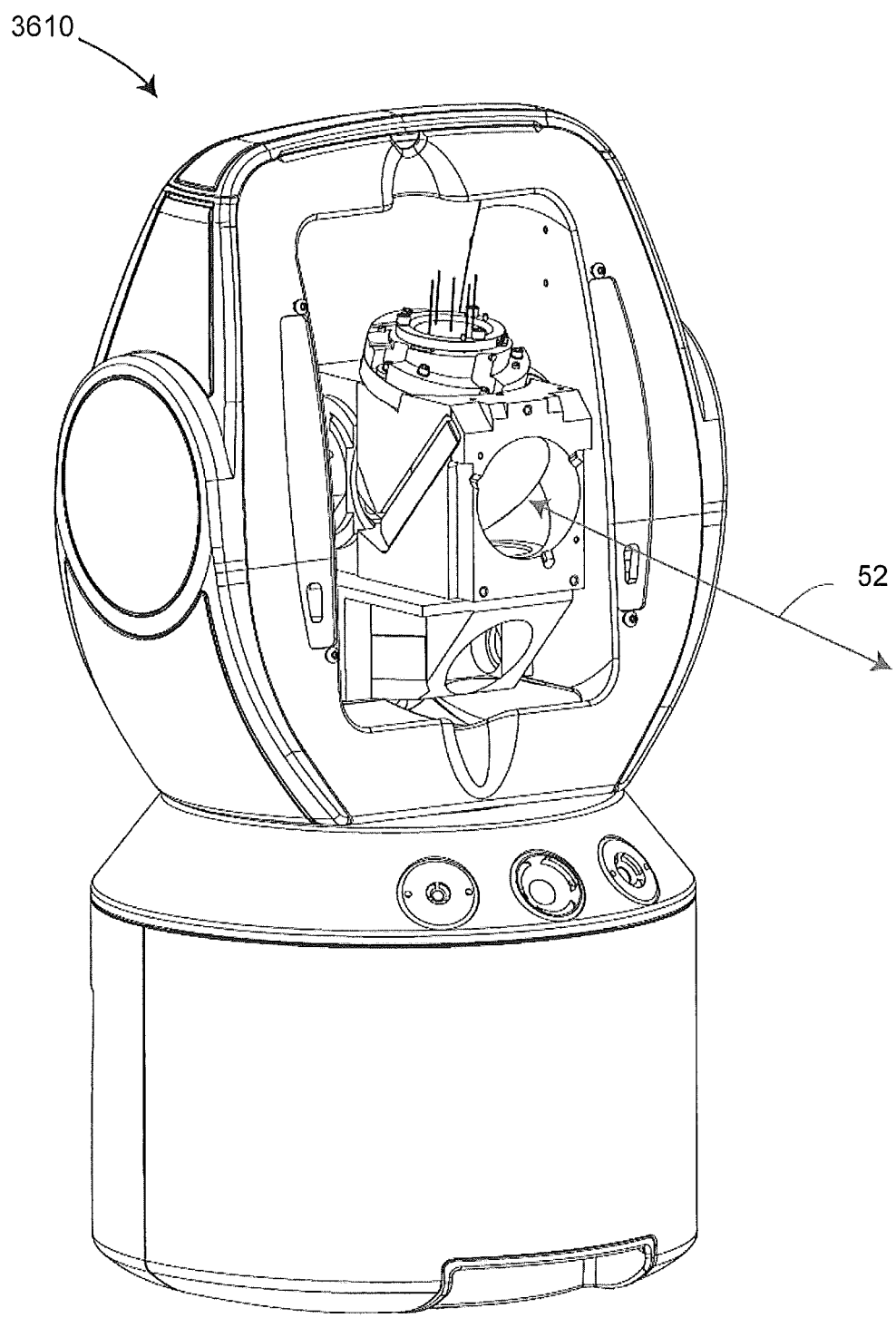
FIGS. 12-14 are perspective views of the device of the FIG. 1 illustrating another embodiment of the scanner portion and the tracker portion.
Figure 13:
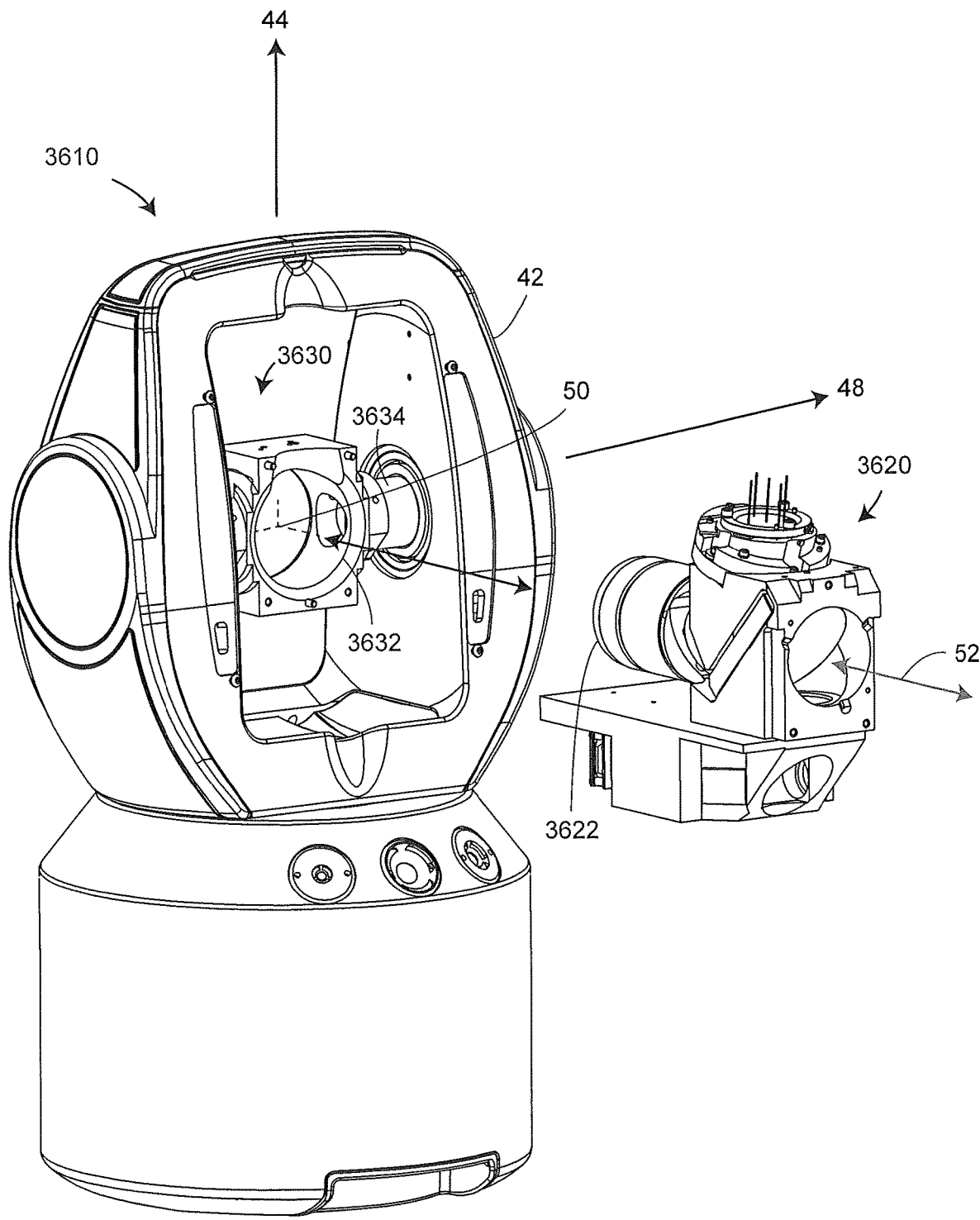
Figure 14:
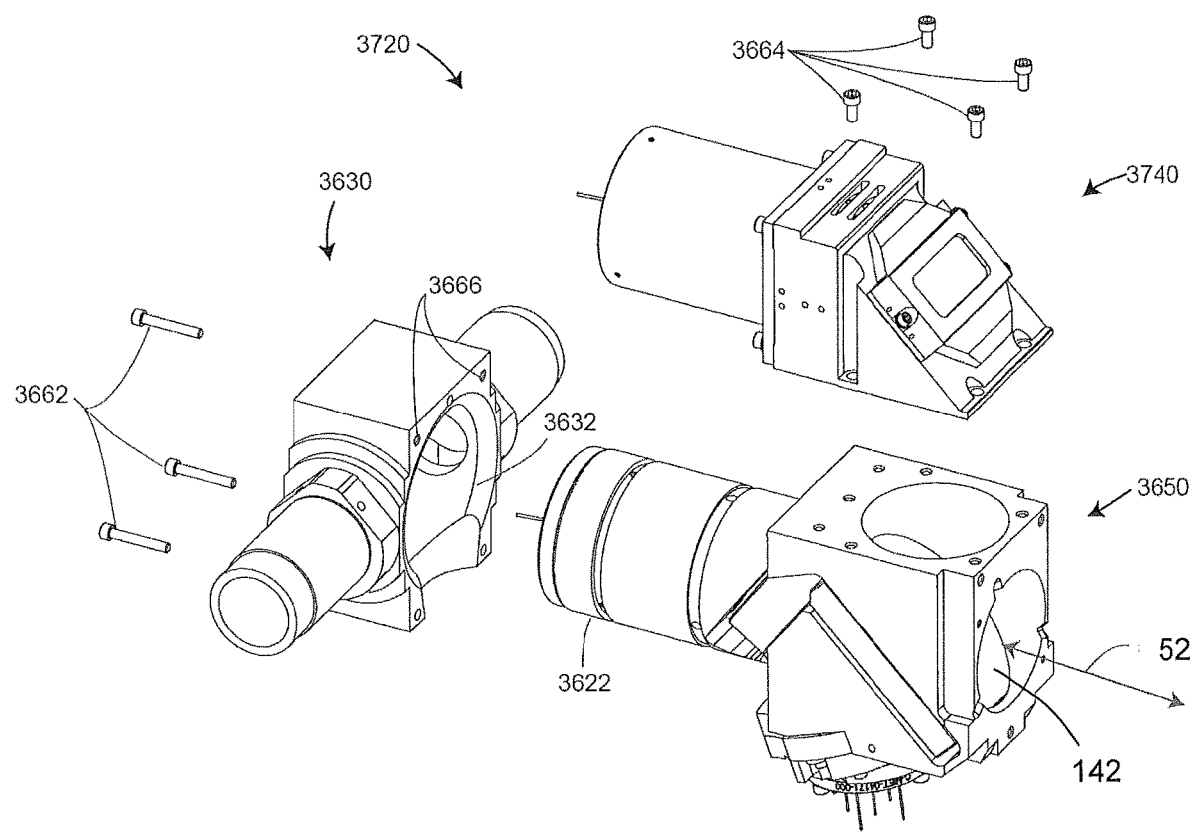

Referring now to FIGS. 12-14, an embodiment of the device is shown with front covers removed and some optical and electrical components omitted for clarity. In this embodiment the device 30 includes a gimbal assembly 3610, which includes a zenith shaft 3630 and an optics bench assembly 3620 having a mating tube 3622. The zenith shaft includes a shaft 3634 and a mating sleeve 3632. The zenith shaft 3630 may be fabricated from a single piece of metal in order to improve rigidity and temperature stability. FIG. 14 shows an embodiment of an optics bench assembly 3720 and zenith shaft 3630. The optics bench assembly 3720 includes a main optics assembly 3650 and a secondary optics assembly 3740. The housing for the main optics assembly 3650 may be fabricated out of single piece of metal to improve rigidity and temperature stability and includes a mating tube 3622. In an embodiment, the central axis of the mating tube 3622 is aligned with the central axis of the mating sleeve 3632. In one embodiment, four fasteners 3664 attach secondary optics assembly 3740 to the main optics assembly 3650. The mating tube 3622 is inserted into the mating sleeve 3632 and held in place by three screws 3662. In an embodiment, the mating tube 3622 is aligned with this mating sleeve 3632 by means of two pins on one end of meeting tube 3622, the pins fitting into holes 3666.

Although the gimbal assembly 3610 is designed to hold an optical bench 3620, other types of devices such as a camera, a laser engraver, a video tracker, a laser pointer and angular measuring device, or a Light Detection and Ranging (LIDAR) system could be disposed on the zenith shaft 3630. Due to the alignment registration provided by the mating sleeve 3632, such devices could be easily and accurately attached to the gimbal assembly 3610. In the exemplary embodiment, the tracker portion 34 is arranged within the main optics assembly 3650, while the scanner portion 36 is disposed in the secondary optics assembly 3740. The dichroic mirror 142 is arranged in the main optics assembly 3650 as shown in FIG. 14.

Figure 15:
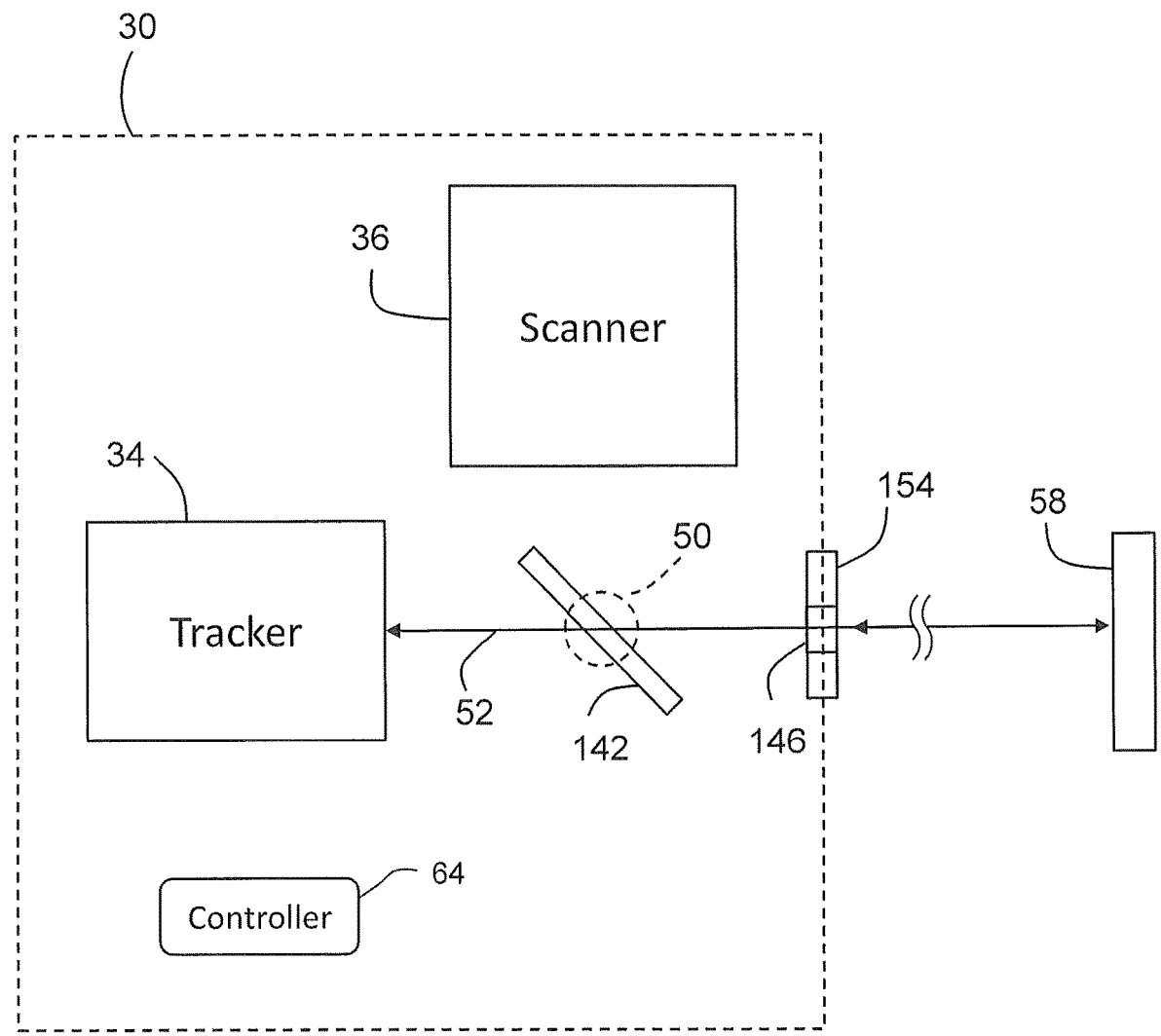
FIG. 15 is a schematic illustration of an optical measurement device in a first mode of operation in accordance with an embodiment of the invention.
Figure 16:
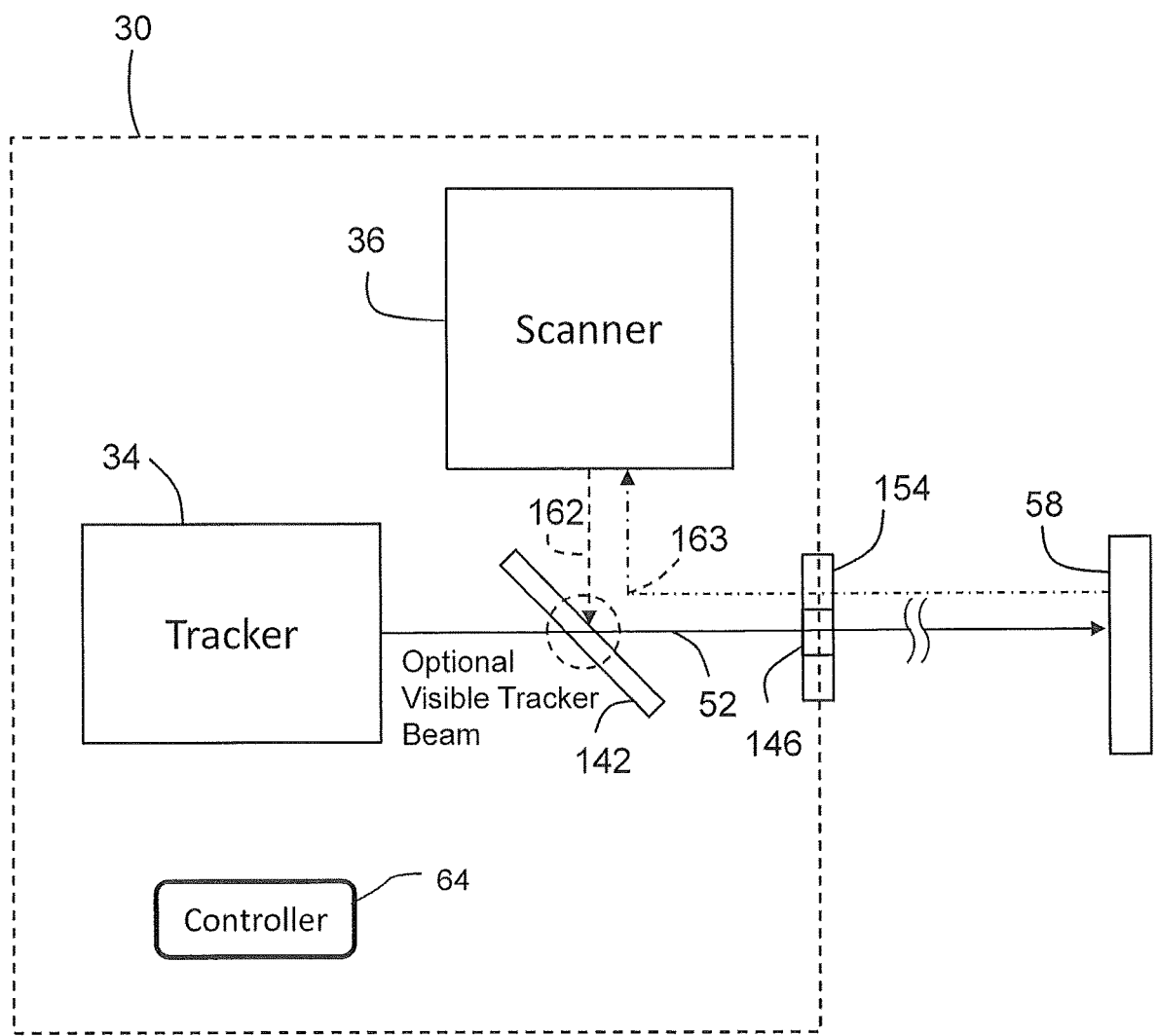
FIG. 16 is a schematic illustration of the optical measurement device of FIG. 1 in a second mode of operation.

In operation, the device 30 has two modes of operation, as shown in FIG. 15 and FIG. 16, depending on the level of accuracy desired. The first mode (FIG. 15) uses the tracker portion 34 in combination with a cooperative target 58, such as a retroreflector target, which might be a spherically mounted retroreflector (SMR) for example. In this first mode, the device 30 emits a light beam 52 that virtually passes through the gimbal point 50, dichroic mirror 142, and aperture 146 towards target 58. The light 52 strikes the target 58, and a portion of the light travels back along the same optical pathway through the aperture 146 and the dichroic mirror 142 to the tracker portion 34. The device 30 then determines the distance from the device 30 to the target 58 as discussed herein above with respect to FIGS. 4-10. In an embodiment, during this first mode of operation, the scanner portion 36 does not operate.

In the second mode of operation shown in FIG. 16, the scanner portion 36 emits a light beam 162 that reflects off of the dichroic mirror 142 and is emitted through the aperture 146 toward the target 58. It should be appreciated that the scanner portion 36 may measure the distance to a noncooperative target and does not need a target such as a retroreflector to obtain measurements. The light reflects (scatters) off of the target 58 and a portion 163 of the light returns through the annular aperture 154. As discussed above it is desirable for the returning light 163 to pass through the annular aperture 154 since this provides advantages in reducing back reflections from the optics which could corrupt the returning light signal. The returning light 163 reflects off of the dichroic mirror 142 back to the scanner portion 36 whereupon the distance from the device 30 to the target 58 is determined as discussed herein above with respect to FIG. 11. The scanner portion 36 operates continuously as the payload structure 46 is rotated simultaneously about the azimuth axis 44 and the zenith axis 48. In the exemplary embodiment, the path followed by the light beam 162 proceeds in a single direction (e.g. does not reverse) as the payload 46 rotates about the axis 44, 48. This pathway may be achieved by continuously rotating each of the zenith and azimuth motors in a single direction. Another way of stating this is to say that in the second mode, the beam is directed to an object surface while the zenith and azimuth angles are continuously and monotonically changing. Notice that the beam may be steered rapidly about one axis (either zenith or azimuth axis) while steered relatively more slowly about the other axis. In one embodiment, the movement of the payload 46 cases results in the light beam 162 following a spiral pathway.

It should be appreciated that having the scanner portion 36 operate such that the path of the light beam 162 does not have to reverse provides several advantages over scanners that follow a raster-type pattern or a random pattern. First, a large amount of data may be efficiently collected since a reversal of direction is not required. As a result, the scanner portion 36 can effectively scan a large area while acquiring data at a high sample rate, such as more than one million three-dimensional points per second. Second, by proceeding continuously in a single direction, in the event that the light beam intersects with a person, the total energy deposited on an area of the person is small. This allows for a more desirable IEC 60825-1 laser categorization.

In one embodiment, the tracker portion 34 emits a light beam 52 in the visible light spectrum. In this embodiment, the tracker portion 34 may emit the light beam 52 as the scanner portion 36 emits light 162. This provides advantages since the visible light 52 from the tracker portion 34 provides a visible reference for the operator.

Figure 17:
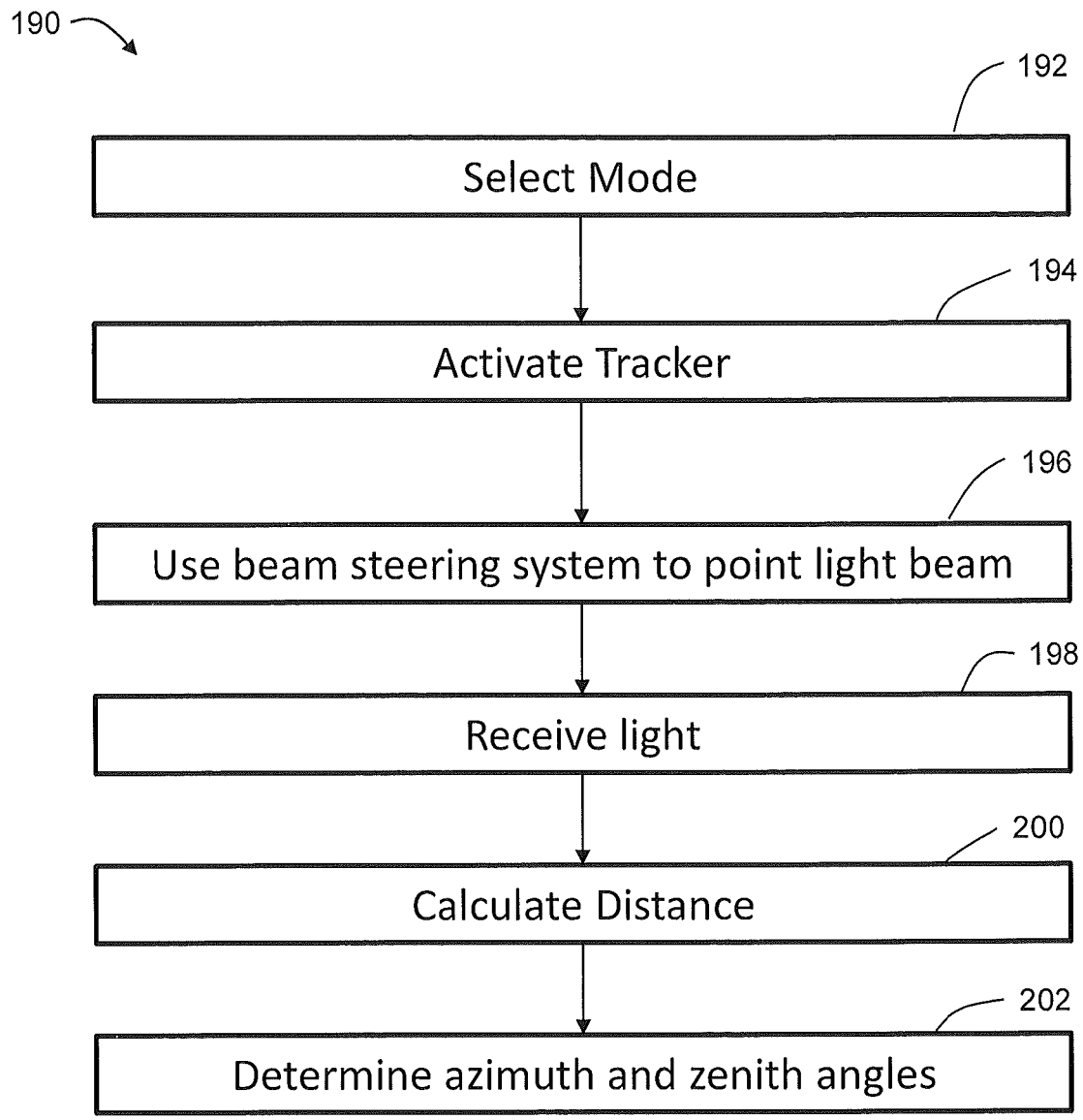
FIGS. 17-18 are flow diagrams showing the steps for operating the optical measurement device.
Figure 18:
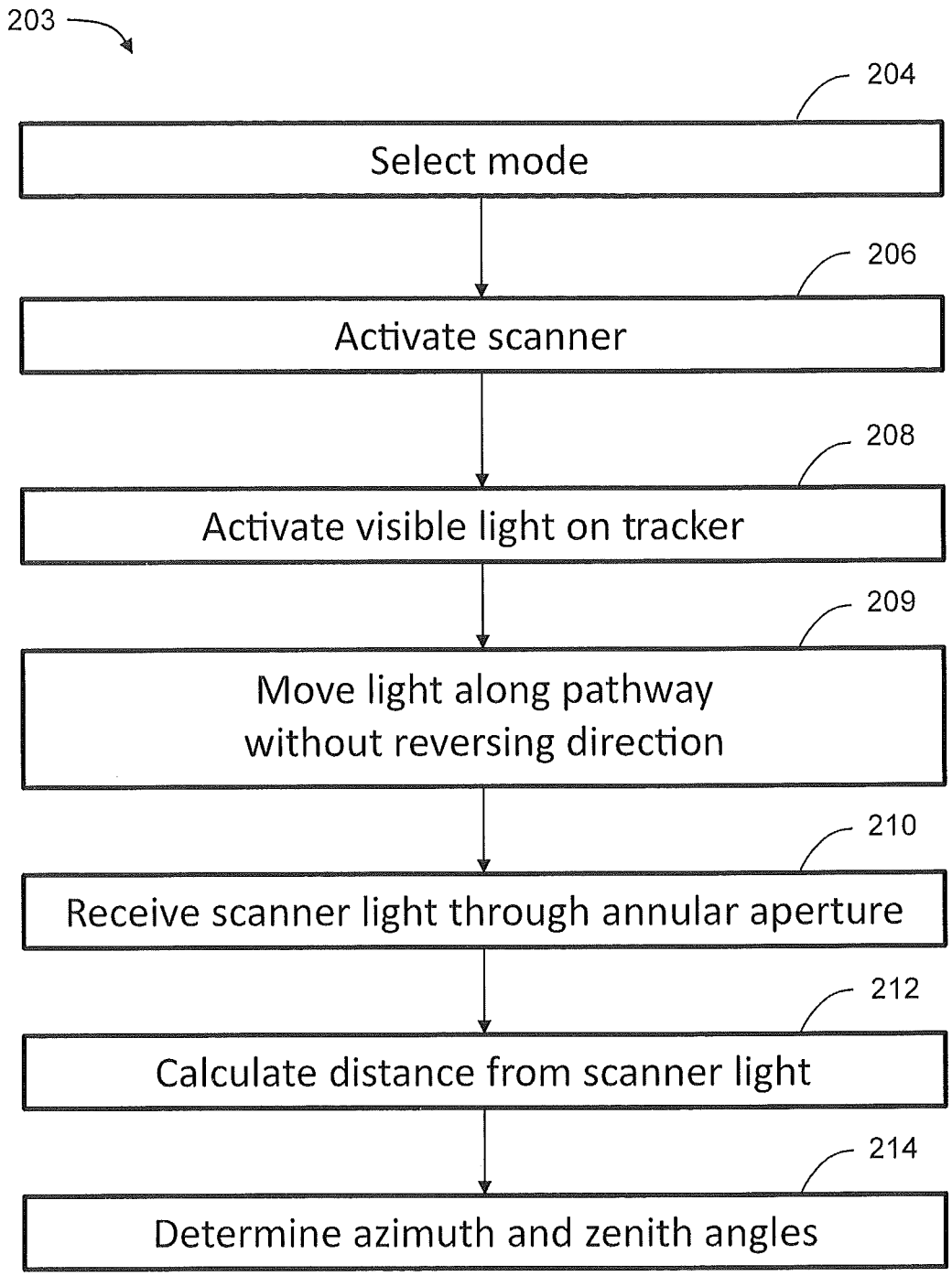

Turning now to FIGS. 17-18, a method of operating the device 30 is shown. The method 190 starts with selecting a mode of operation to tracker portion 34 in block 192. The method then proceeds to block 194 where the tracker portion 34 is activated. The gimbal mechanism is then moved about the zenith and azimuth axes in block 196 to steer the light beam toward the target 58. The light reflects off the cooperative target 58 and returns to the device 30 through aperture 146 in block 198. The device 30 then calculates the distance from the device 30 the target 58 in block 200. The azimuth and zenith angles are determined in block 202 and the three-dimensional coordinates (distance and two angles) for the measured point are determined. This process may be repeated until all the desired measured points have been determined.

Referring now to FIG. 18 the method 203 is shown wherein the scanner portion 36 is selected in block 204. The method 203 then proceeds to block 206 where the scanner portion 36 is activated. Where it is desirable to provide a visible reference light, the light from tracker portion 34 is activated in block 208. The light is transmitted from the scanner portion 36 through the aperture 146 towards the target 58. In the exemplary embodiment, the light from the scanner portion 36 is emitted along a pathway in a single direction (such as a spiral shape) without reversing direction as indicated in block 209. The light is reflected off of the target 58 and back towards the device 30. The returning light is received through the annular aperture 154 in block 210. The distance from the device 30 the target 58 is determined in block 212. The azimuth and zenith angles are determined in block 214 and coordinates (distance and two angles) to the measured point on target 58 are determined.

The method of directing the beam of light from the scanner portion 36 to the object 59 may be carried out in different ways. In a first embodiment, light from the scanner portion 36 is directed with the gimbal assembly 3610 facing in the same general direction. In this mode of operation, the beam is directed to any desired point. In a second embodiment, light from the scanner portion 36 is directed with the gimbal assembly 3610 spinning at a relatively rapid constant rate about an axis, which might be either the azimuth axis or the zenith axis. The other axis is also moved but at a relatively slower rate. In this way, the beam is directed in a slow spiral. With the second embodiment, a thorough scan of a large volume can be quickly performed. Another advantage of the second embodiment is that the constantly moving beam intercepts the pupil of the human eye for a shorter time during its continual movement. Because of this, higher laser powers can be used while providing a desired IEC 60825-1 categorization.

Figure 19:
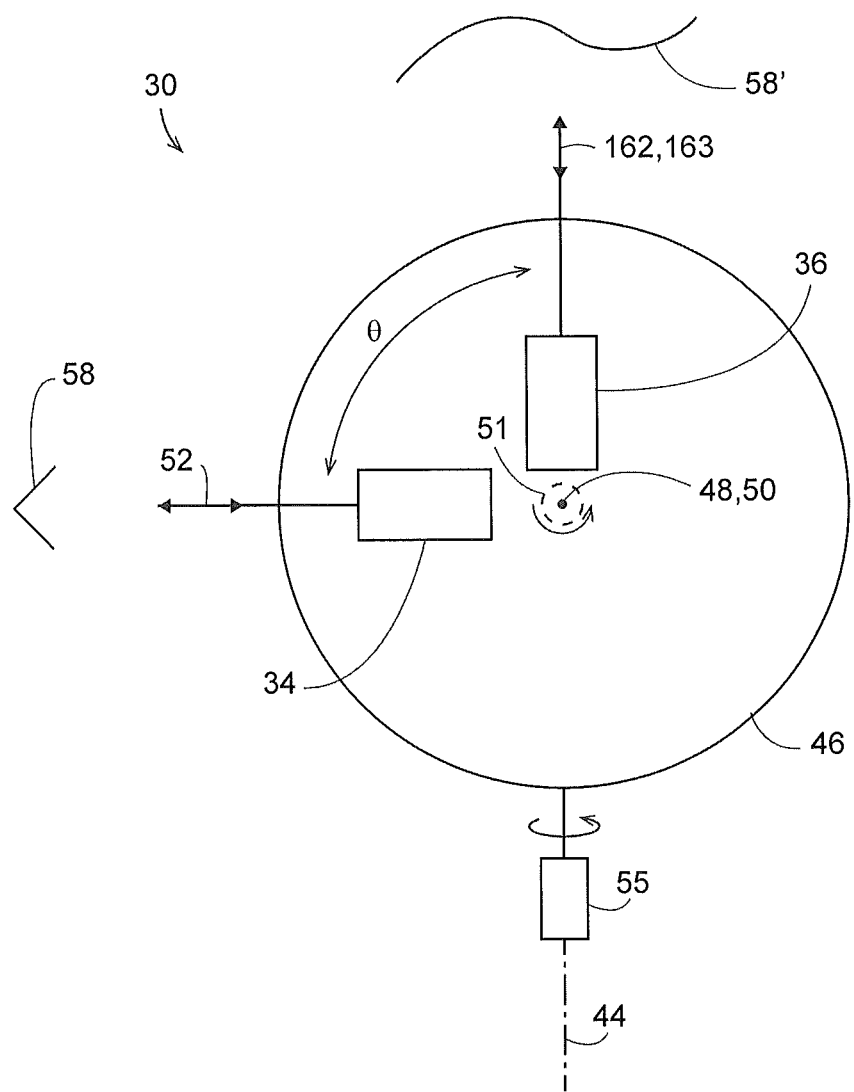
FIG. 19 shows an apparatus that emits tracker light and scanner light in two different directions from the scanner-tracker according to an embodiment.

Referring now to FIG. 19, another embodiment of the device 30 is shown having a first absolute distance meter within the tracker portion 34 and a second absolute distance meter within the scanner portion 36, the portions 34 and 36 coupled to a payload structure 46. In this embodiment, the tracker portion 34 and the scanner 36 do not emit light over a common optical pathway. The tracker portion 34 is arranged to direct the light beam 52 in a first radial direction while the scanner 36 is arranged to direct the light beam 162 in a second radial direction toward a surface 58'. The first radial direction and second radial direction define an angle θ therebetween. In the exemplary embodiment, the angle θ is 90 degrees. In other embodiments, the angle θ is between 5 degrees and 180 degrees. However, any suitable angle may be used which allows the tracker portion 34 and the scanner portion 36 to be positioned within the payload structure 46. It should be appreciated that as the payload structure 46 is rotated about the azimuth axis 44, the tracker portion 34 and the scanner 36 will be oriented on the same azimuth angle.

Figure 20:
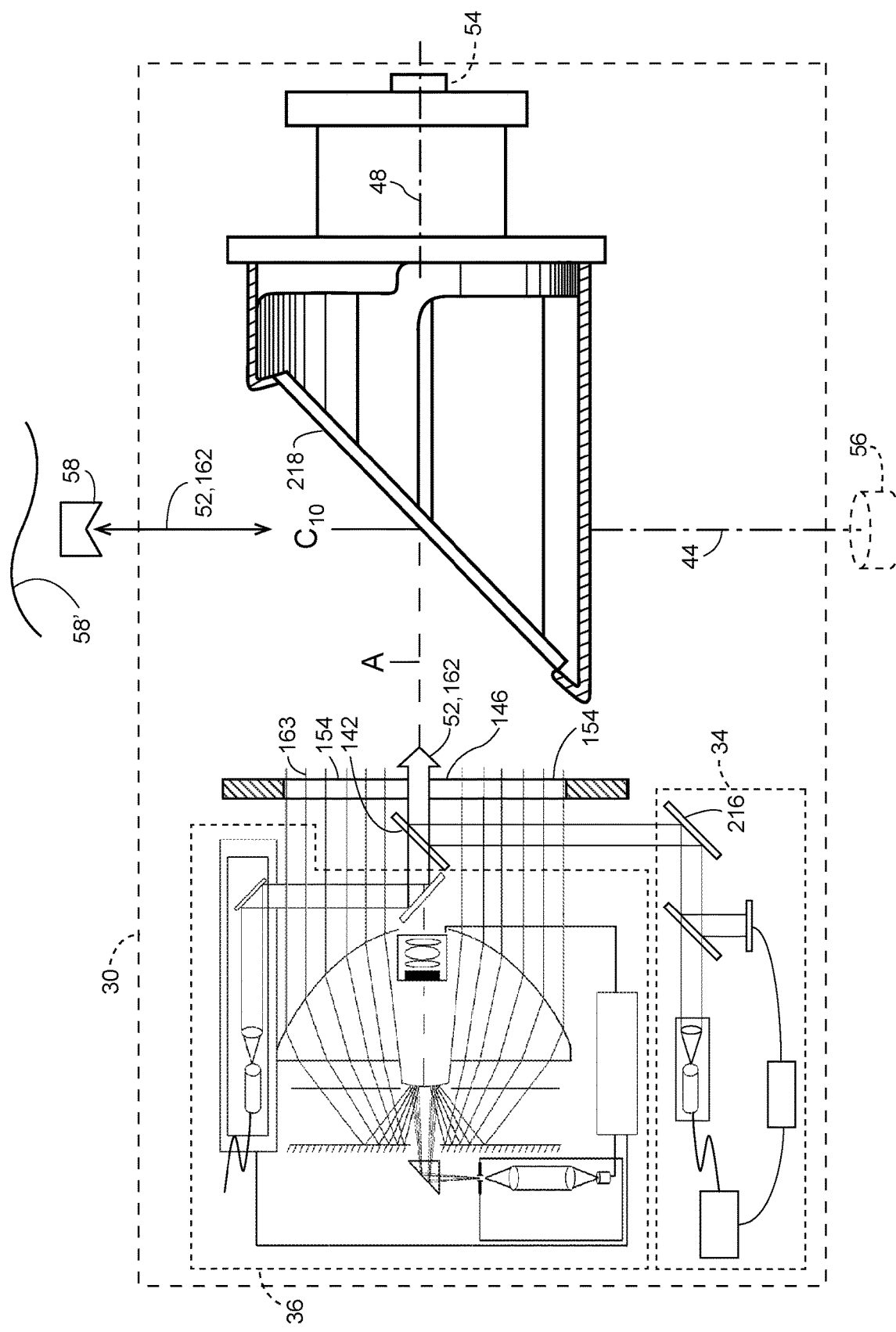
FIG. 20 is a schematic illustration of a scanner-tracker device that uses a rotating mirror to direct a beam of light from the tracker to a retroreflector according to an embodiment of the invention.

Referring now to FIG. 20, another embodiment of the device 30 is shown having a tracker portion 34 and a scanner portion 36. In this embodiment, the tracker portion is oriented in parallel with the scanner portion 36 and uses a mirror 216 to reflect the light 52 towards the dichroic beam splitter 142. In this embodiment, the dichroic beam splitter 142 is configured to reflect the light 52 while allowing the light 162 from the scanner portion 36 to pass through.

The light beams 52, 162 pass through an aperture 146 and are directed along the optical axis A toward an angled rotating mirror 218 that is arranged to rotate about a horizontal axis 48. The outbound light 52, 162 reflects off of the mirror at the center $C_{10}$ where it is reflected off and deflected towards the target 58 (for the tracker portion) or the surface 58' (for the scanner portion). The center $C_{10}$ defines the origin of the reference system. The reflected light from the target 58 or surface 58' is reflected back off of the rotary mirror 218 and back toward the aperture 146. The light 52 reflects off of the rotary mirror 218 at the center $C_{10}$ and back through the aperture 146. The light 52 reflects off of dichroic mirror 142 and mirror 216 before returning to the tracker portion 34. The returning light 163 reflects off the rotary mirror 218 and passes through the annular aperture 154 before returning to the scanner 36.

The direction of the emitted light 52, 162 and the reflected light results from the angular positions of the rotary mirror 218 about the horizontal axis 48 and vertical axis 44. The angular positions are measured by encoders 54, 56 respectively. It should be appreciated that in one mode of operation, the measurements by the tracker portion 34 and scanner portion 36 are performed by the means of a fast rotation of the mirror 16 and the slow rotation of the payload structure 46. Thus, the whole space may be measured, step by step, as the device progresses in a circle.

In an embodiment, the beam of light from the scanner is adjustably focused rather than collimated. In geometrical optics, a focused beam of light is brought to a point, but in reality, the beam of light is brought to a beam waist near the calculated focus position. At the beam waist position, the width of the beam is at its smallest as the beam propagates.

One advantage of sending a focused beam of light from the scanner is that a smaller beam can more accurately determine 3D coordinates at edges. For example, a smaller focused beam permits more accurate determination of hole diameter or of feature size. Another advantage of sending a focused beam of light from the scanner is that a focused beam can be steered to find the position of maximum reflectance of light from a tooling ball retroreflector, which is simply a shiny/highly-reflective metallic sphere. Such a method of directing a beam of light from the scanner to the tooling ball permits accurate determination of distance and angles to the tooling ball. Because of this, the tooling ball can be used as a target. With a device that combines scanner and tracker functionality, as illustrated herein, two types of targets are then made available: SMRs and tooling balls. The use of two different types of targets provides an easy method for getting the tracker and the scanner systems in the same frame of reference since the SMRs and tooling balls can both be held in the same magnetic nests distributed throughout an environment.

Figure 21:
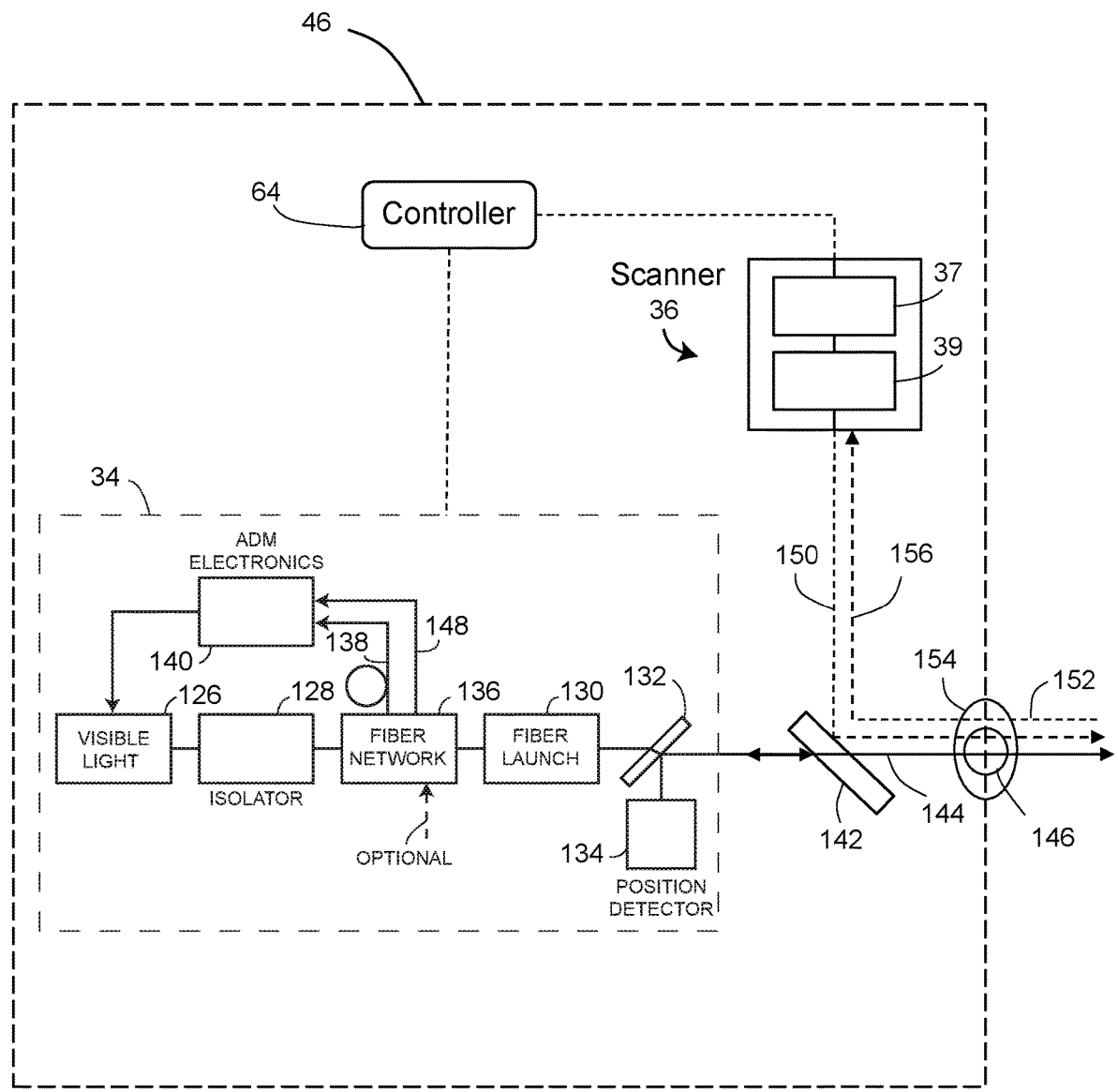
FIG. 21 is a schematic illustration of the device payload portion of FIG. 1 including a block diagram of the of the optical measurement device in accordance with an embodiment of the invention.
Figure 22:
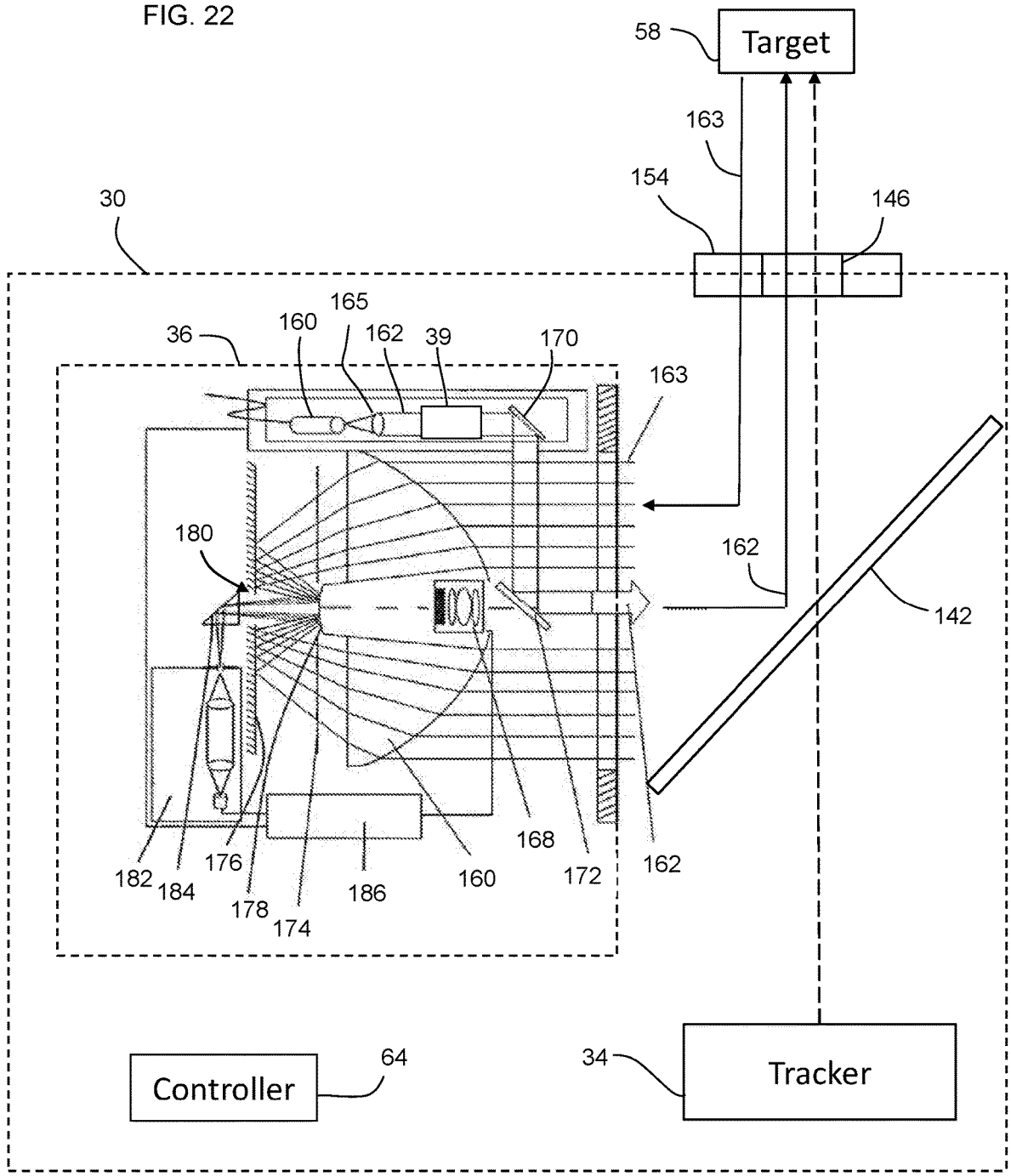
FIG. 22 is a schematic illustration of the device of FIG. 1 showing an optical axis along which light from the tracker and scanner is projected.
Figure 23:
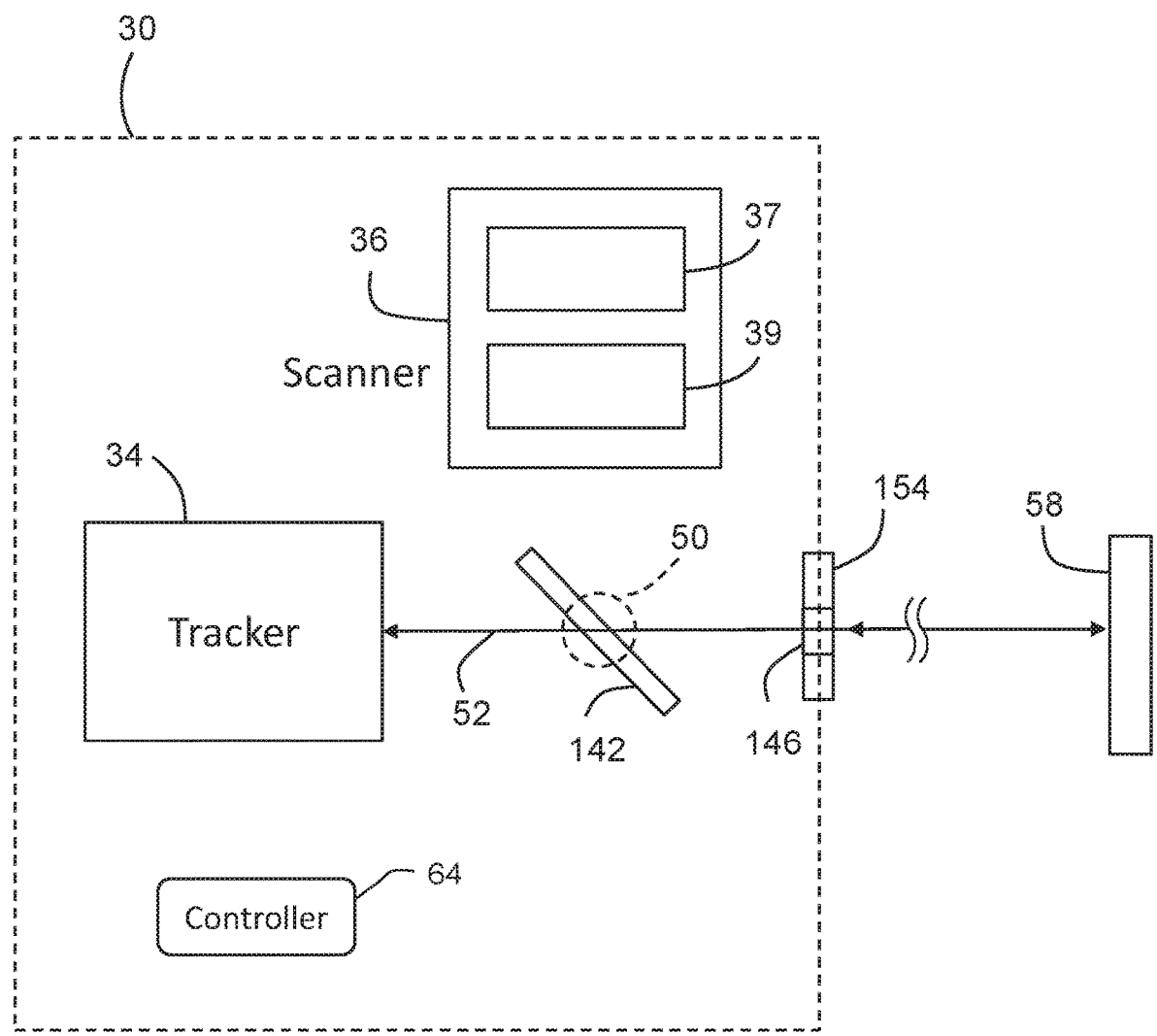
FIG. 23 is a schematic illustration of an optical measurement device in a first mode of operation in accordance with an embodiment of the invention.
Figure 24:
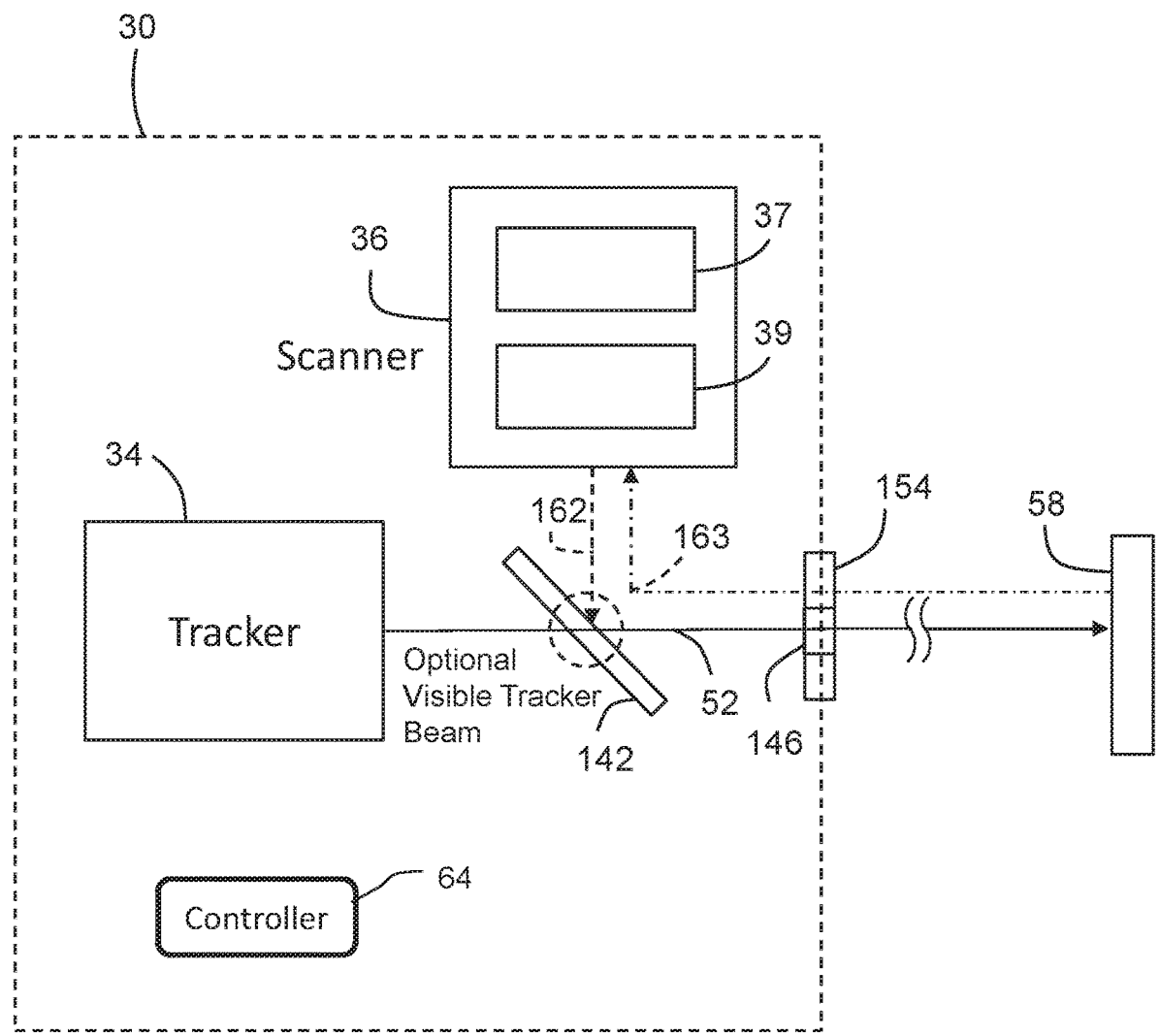
FIG. 24 is a schematic illustration of the optical measurement device of FIG. 1 in a second mode of operation.
Figure 25:
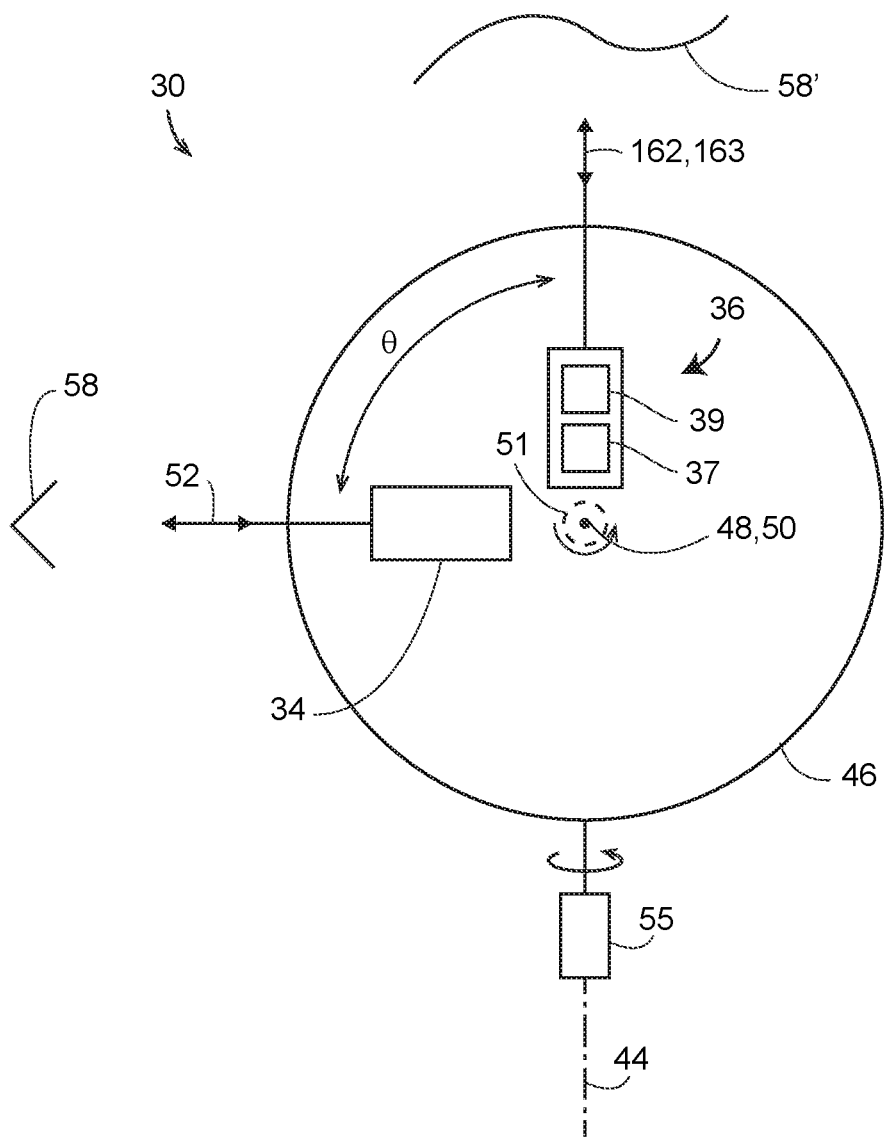
FIG. 25 shows an apparatus that emits tracker light and scanner light in two different directions from the scanner-tracker according to an embodiment.

In an embodiment, an adjustable focusing element 39 is added to other elements of the scanner 36. This additional adjustable focusing element is shown in FIGS. 21-26. FIG. 21 is similar to FIG. 4 except that the scanner 36 is shown to have two internal elements—scanner elements 37 and adjustable focusing mechanism 39. FIG. 22 is similar to FIG. 11 except that an adjustable focusing mechanism 39 is included in the scanner 36. FIGS. 23, 24 are similar to FIGS. 15, 16 except that the scanner 36 is shown to include scanner elements 37 and adjustable focusing mechanism 39. FIG. 25 is similar to FIG. 19 except the scanner 36 is shown to include scanner elements 37 and adjustable focusing mechanism 39.

In an embodiment, the adjustable focusing mechanism 39 includes some basic lens elements, which may include optional elements 2604, 2606. In addition, the adjustable focusing mechanism 39 includes a lens element 2602 attached to a motorized adjustment stage 2610 configured to move the lens 2602 back and forth to obtain the desired adjustment. In an embodiment, the scanner electronics 96 of FIG. 3 provides the electrical control of the motorized adjustment stage 2610.

Many types of lens assemblies and adjustment methods are known in the art for providing adjustable focus in a lens assembly. It is understood to one of ordinary skill in the art that any such methods may be used to provide adjustable focus in the present invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A coordinate measurement device comprising:
a structure rotatable about a first axis and a second axis, the second axis being substantially perpendicular to the first axis;
an optical delivery system operably coupled to the structure;
a first absolute distance meter operable to determine a first distance from the coordinate measurement device to a retroreflector target based at least in part on a first light emitted through the optical delivery system;
a second absolute distance meter having an adjustable focusing mechanism, the second absolute distance meter being operable to determine a second distance from the coordinate measurement device to an object surface based at least in part on a second light emitted through the optical delivery system;
a position detector operable to receive a portion of the first light reflected by the retroreflector target, the position detector operable to generate a signal based at least in part on a location at which the portion of first light strikes the position detector; and a processor having a non-transitory computer readable media configured to operate in a first mode and a second mode;

wherein the first mode includes tracking the retroreflector target based at least in part on the signal, and determining a first three-dimensional coordinate of the retroreflector target based at least in part on a first angle of rotation of the structure about the first axis to the retroreflector target at, the second angle of rotation of the structure about the second axis to the retroreflector target, and the first distance of the retroreflector target; and wherein the second mode includes directing the second light to the object surface and determining a second three-dimensional coordinate of a point on the object surface based at least in part on the first angle of rotation of the structure about the first axis to the point on the object surface, the second angle of rotation of the structure about the second axis to the point on the object surface, and the second distance of the point on the object surface, the second mode further including adjusting the adjustable focusing mechanism.

2. The coordinate measurement device of claim 1 wherein:

the optical delivery system has an inner beam path and an outer beam path, the outer beam path coaxial with the inner beam path and outside the inner beam path;

the first absolute distance meter includes a first optical detector operable to receive the first light reflected by the retroreflector target and passed through the inner beam path of the optical delivery system; and the second absolute distance meter includes a second optical detector is operable to receive the second light reflected by the object surface and passed through the outer beam path of the optical delivery system.

3. The coordinate measurement device of claim 1 wherein rotating of the structure unidirectionally emits the second light along a pathway having a spiral shape.

4. The coordinate measurement device of claim 1 wherein the optical delivery system further includes an annular aperture positioned to receive the portion of the second light reflected by the object surface.

5. The coordinate measurement device of claim 4 wherein the processor is configured to emit the first light when the second absolute distance meter is emitting the second light.

6. The coordinate measurement device of claim 1 wherein the first light has a wavelength of 700 nanometers.

7. The coordinate measurement device of claim 6 wherein the second light has a wavelength of 1550 nanometers.

8. A method of determining three-dimensional coordinates with a coordinate measurement device, the method comprising:

providing a structure rotatable about a first axis and a second axis, the second axis being perpendicular to the first axis;

emitting a first light from a first absolute distance meter towards a retroreflector via an optical delivery system, the first absolute distance meter and optical delivery system being operably coupled to the structure;

determining a first distance from the coordinate measurement device to the retroreflector with the first absolute distance meter based at least in part on the first light;

emitting a second light with a second absolute distance meter towards an object surface via the optical delivery system, the second absolute distance meter being operably coupled to the structure;

determining a second distance from the coordinate measurement device to a point on the object surface based on the optical delivery system;

receiving a portion of the first light reflected by the retroreflector target with a position detector and generating a signal with the position detector based at least in part on a location at which the portion of the first light strikes the position detector;

tracking, in a first mode of operation, the retroreflector target based at least in part on the signal, and determining a first three-dimensional coordinate of the retroreflector target based at least in part on a first angle of rotation of the structure about the first axis to the retroreflector target at, the second angle of rotation of the structure about the second axis to the retroreflector target, and the first distance of the retroreflector target; and directing, in a second mode of operation, the second light to the object surface and determining a second three-dimensional coordinate of a point on the object surface based at least in part on the first angle of rotation of the structure about the first axis to the point on the object surface, the second angle of rotation of the structure about the second axis to the point on the object surface, and the second distance of the point on the object surface, the second mode of operation further including adjusting an adjustable focusing mechanism.

9. The method of claim 8, further comprising:

receiving the first light reflected by the retroreflector target via an inner beam path of the optical delivery system; and receiving the second light reflected by the object surface via an outer beam path of the optical delivery system.

10. The method of claim 8, further comprising rotating the structure unidirectionally and emitting the second light along a pathway having a spiral shape.

11. The method of claim 8, further comprising receiving the portion of the second light reflected by the object surface via an annular aperture in the optical delivery system.

12. The method of claim 11, wherein the first light is emitted at the same time as the second light.

13. The method of claim 8, wherein the first light has a wavelength of 700 nanometers.

14. The method of claim 13, wherein the second light has a wavelength of 1500 nanometers.

* * * * *